United States Patent
Courtney et al.

(10) Patent No.: US 9,985,436 B2
(45) Date of Patent: May 29, 2018

(54) DIGITAL MESSAGES IN A LOAD CONTROL SYSTEM

(71) Applicant: Lutron Electronics Co., Inc., Coopersburg, PA (US)

(72) Inventors: Brian Michael Courtney, Bethlehem, PA (US); Timothy Gill, Bethlehem, PA (US); Sriram Gopalakrishnan, Bethlehem, PA (US); Roshni Ashwin Shah, Macungie, PA (US); Vidya Sukumar, Allentown, PA (US); Mark S. Taipale, Harleysville, PA (US); Mark Yorgey, Allentown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 251 days.

(21) Appl. No.: 14/683,982

(22) Filed: Apr. 10, 2015

(65) Prior Publication Data
US 2015/0295411 A1 Oct. 15, 2015

Related U.S. Application Data

(60) Provisional application No. 61/978,579, filed on Apr. 11, 2014.

(51) Int. Cl.
*H02J 3/14* (2006.01)
*G05B 15/02* (2006.01)
*H05B 37/02* (2006.01)

(52) U.S. Cl.
CPC ............. *H02J 3/14* (2013.01); *G05B 15/02* (2013.01); *H05B 37/029* (2013.01); *H05B 37/0245* (2013.01)

(58) Field of Classification Search
CPC ....... H02J 3/14; G05B 15/02; H05B 37/0245; H05B 37/029

USPC .......................................................... 700/295
See application file for complete search history.

(56) References Cited

U.S. PATENT DOCUMENTS

| | | | |
|---|---|---|---|
| 4,642,787 A * | 2/1987 | McCarthy | G07C 5/10 235/97 |
| 5,191,265 A | 3/1993 | D'Aleo et al. | |
| 5,248,919 A | 9/1993 | Hanna et al. | |
| 5,530,322 A | 6/1996 | Ference et al. | |
| 5,838,226 A | 11/1998 | Houggy et al. | |
| 5,848,054 A | 12/1998 | Mosebrook et al. | |
| 5,905,442 A | 5/1999 | Mosebrook et al. | |
| 6,188,181 B1 | 2/2001 | Sinha et al. | |
| 6,687,487 B1 | 2/2004 | Mosebrook et al. | |
| 6,803,728 B2 | 10/2004 | Balasubramaniam et al. | |
| 6,927,547 B2 | 8/2005 | Walko, Jr. et al. | |
| 6,983,783 B2 | 1/2006 | Carmen, Jr. et al. | |
| 7,085,627 B2 | 8/2006 | Bamberger et al. | |
| 7,369,060 B2 | 5/2008 | Veskovic et al. | |
| 7,391,297 B2 | 6/2008 | Cash et al. | |
| 7,675,195 B2 | 3/2010 | Mierta | |

(Continued)

*Primary Examiner* — Kenneth M Lo
*Assistant Examiner* — Michael W Choi
(74) *Attorney, Agent, or Firm* — Glen Farbanish; Amy Yanek

(57) ABSTRACT

A load control system may comprise load control devices for controlling respective electrical loads, and a system controller operable to transmit digital messages including different commands to the load control devices in response to a selection of a preset. The different commands may include a preset command configured to identify preset data in a device database stored at the load control device and/or a multi-output command configured to define the preset data for being stored in the device database. The system controller may decide which of the commands to transmit to the load control devices in response to the selection of the preset.

40 Claims, 10 Drawing Sheets

(56) References Cited

U.S. PATENT DOCUMENTS

| | | |
|---|---|---|
| 7,787,485 B2 | 8/2010 | Howe et al. |
| 7,880,638 B2 | 2/2011 | Veskovic et al. |
| 7,924,174 B1 | 4/2011 | Gananathan |
| 8,009,042 B2 | 8/2011 | Steiner et al. |
| 8,199,010 B2 | 6/2012 | Sloan et al. |
| 8,228,184 B2 | 7/2012 | Blakeley et al. |
| 8,306,151 B2 | 11/2012 | Yang |
| 8,368,310 B1* | 2/2013 | Roosli ............... H05B 37/0245 315/152 |
| 8,410,706 B2 | 4/2013 | Steiner et al. |
| 8,451,116 B2 | 5/2013 | Steiner et al. |
| 2002/0060530 A1* | 5/2002 | Sembhi ............... H05B 37/029 315/291 |
| 2008/0092075 A1 | 4/2008 | Jacob et al. |
| 2008/0191837 A1* | 8/2008 | Stocker ............... H04L 12/403 340/3.51 |
| 2008/0218099 A1* | 9/2008 | Newman ............. H05B 39/088 315/268 |
| 2009/0206983 A1* | 8/2009 | Knode .................. G08C 17/02 340/3.7 |
| 2011/0140832 A1* | 6/2011 | Vinkenvleugel ... H05B 37/0272 340/4.2 |
| 2012/0091804 A1* | 4/2012 | Altonen .................. E06B 9/68 307/31 |
| 2012/0095601 A1* | 4/2012 | Abraham ................ E06B 9/68 700/278 |
| 2013/0030589 A1 | 1/2013 | Pessina et al. |
| 2014/0132475 A1 | 5/2014 | Bhutani et al. |
| 2014/0266568 A1 | 9/2014 | Cheng et al. |

\* cited by examiner

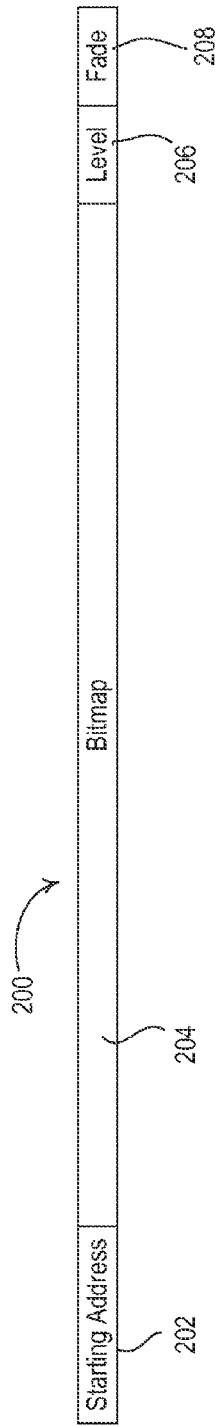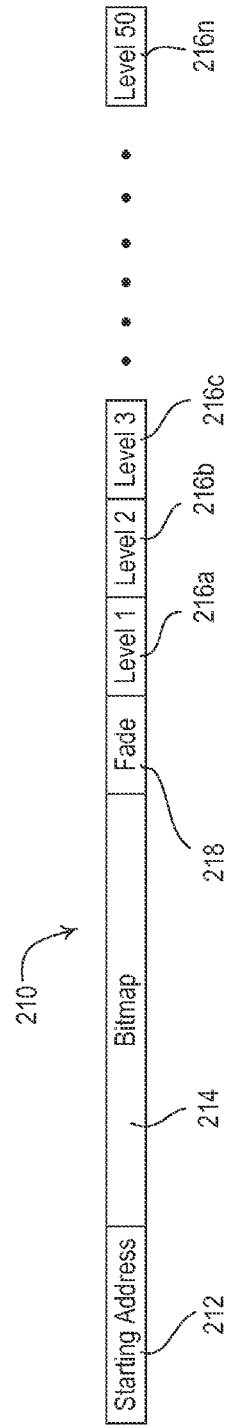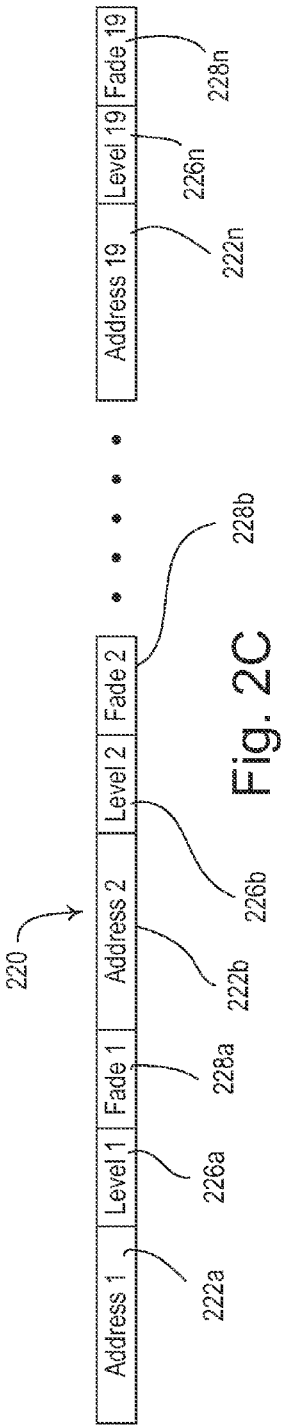

DIGITAL MESSAGES IN A LOAD CONTROL SYSTEM

CROSS-REFERENCE TO RELATED APPLICATIONS

This application claims the benefit of U.S. Provisional Application No. 61/978,579, filed Apr. 11, 2014, which is incorporated by reference herein as if fully set forth.

BACKGROUND

A user environment, such as a residence or an office building for example, may be configured using various types of load control systems. A lighting control system may be used to control the lighting loads in the user environment. A motorized window treatment control system may be used to control the natural light provided to the user environment. A heating, ventilating, and air conditioning (HVAC) system may be used to control the temperature in the user environment. Each load control system may include various control devices, including control-source devices and control-target devices. The control-target devices may receive digital messages, which may include load control instructions, for controlling an electrical load from one or more of the control-source devices. The control-target devices may be capable of directly controlling an electrical load. The control-source devices may be capable of indirectly controlling the electrical load via the control-target device. Examples of control-target devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of control-source devices may include remote control devices, occupancy sensors, daylight sensors, temperature sensors, and/or the like.

Each of the load control systems may allow for the selection of a preset configuration (e.g., a "preset" or "scene"). A preset may be a predefined setting that may be defined at the time of commissioning of the load control system. For example, a lighting control system may set a plurality of lighting loads to different preset intensities in response to the selection of a lighting preset. A preset may be selected in response to an actuation of a button on a control-source device. For example, the control-source may transmit separate digital messages including commands to each of the control-target devices included in the preset, such that the control-target devices are able to adjust the controlled lighting loads in response to the selected preset. If there are a large number of control-target devices included in the selected preset, however, the control-source device may require a large amount of time to transmit the digital messages to the control-target devices. This may result in a noticeable delay between when the first lighting load is adjusted and the last lighting load is adjusted. This visually-piecemeal adjustment of the lighting loads (which may be referred to as, for example, "popcorning") is undesirable.

Accordingly, some lighting control systems have been configured such that the control-source devices may transmit a single digital message in response to the selection of a preset. The single digital message may include an indication of the selected preset. The control-target devices may each store a preconfigured database including configuration information detailing how the respective control-target device should respond to each identified preset to which the control-target device is responsive. Accordingly, after receiving the single digital message including the selected preset, each control-target device is able to appropriately control the respective lighting load in response to the selected preset. An example of such a lighting control system is described in greater detail in commonly-assigned U.S. Pat. No. 6,803,728, issued Oct. 12, 2004, entitled SYSTEM FOR CONTROL OF DEVICES, the entire disclosure of which is hereby incorporated by reference.

However, as the size of the lighting control system enlarges (e.g., as the number of control-source and control-target devices in the load control system increases), the amount of time to transmit the databases to each of the control-target devices during commissioning of the load control system also enlarges. In fact, the amount of time to transmit the databases to each of the control-target devices during commissioning of the load control system may increase to an undesirably long time.

SUMMARY

A load control system may control the amount of power delivered to one or more electrical loads. The load control system may control a plurality of electrical loads in response to the selection of a preset. As described herein, a load control system may comprise a plurality of load control devices for controlling respective electrical loads and a system controller operable to transmit digital messages. The digital messages transmitted by the system controller may include first or second commands to the load control devices in response to a selection of a preset. The first command may describe the selected preset or the operations of the load control devices in response to the selection of the preset. The first command may generally describe the selected preset or the operations of the load control devices in response to the selection of the preset. For example, the first command may comprise the preset identification number, the preset identification name, and/or preset data. The second command may describe in detail the selected preset or the operations of the load control devices in response to the selection of the preset. The second command may specifically describe the selected preset or the operations of the load control devices in response to the selection of the preset. For example, the second command may define the preset. The system controller may be configured to decide which of the first command and the second command to transmit to the load control devices in response to the selection of the preset. For example, the system controller may be configured to receive a load control database defining the operation of the load control devices in response to the selection of the preset. The system controller may be configured to analyze the load control database to determine which of the first and the second commands to transmit to the load control devices in response to the selection of the preset during a commissioning procedure of the load control system. The system controller may also be configured to determine which of the first command and the second command to transmit to the load control devices in response to the selection of the preset, for example, depending upon whether the system controller has previously transmitted the second command to the load control devices for the selected preset.

A method of controlling a plurality of electrical loads is described herein. The method may comprise receiving a selection of a preset and transmitting a digital message to a plurality of load control devices. The digital message may include either a first command or a second command for controlling the electrical loads in response to the selection of the preset. The first command may include a description of the selected preset or the operations of the load control devices in response to the selection of the preset. The first command may generally describe the selected preset or the operations of the load control devices in response to the selection of the preset. For example, the first command may comprise the preset identification number, the preset identification name, and/or preset data. The second command may describe the selected preset or the operations of the load control devices in response to the selection of the preset. The second command may specifically describe the selected preset or the operations of the load control devices in response to the selection of the preset. For example, the second command may define the preset. The method may further comprise deciding, prior to transmitting the digital message, which of the first commands and the second commands to transmit to the load control devices in response to the selection of the preset.

Other features are apparent from the following description that refers to the accompanying drawings.

BRIEF DESCRIPTION OF THE DRAWINGS

FIGS. 2A-2C show diagrams of example digital messages that include multi-output goto-level commands.

DETAILED DESCRIPTION

Figure 1:
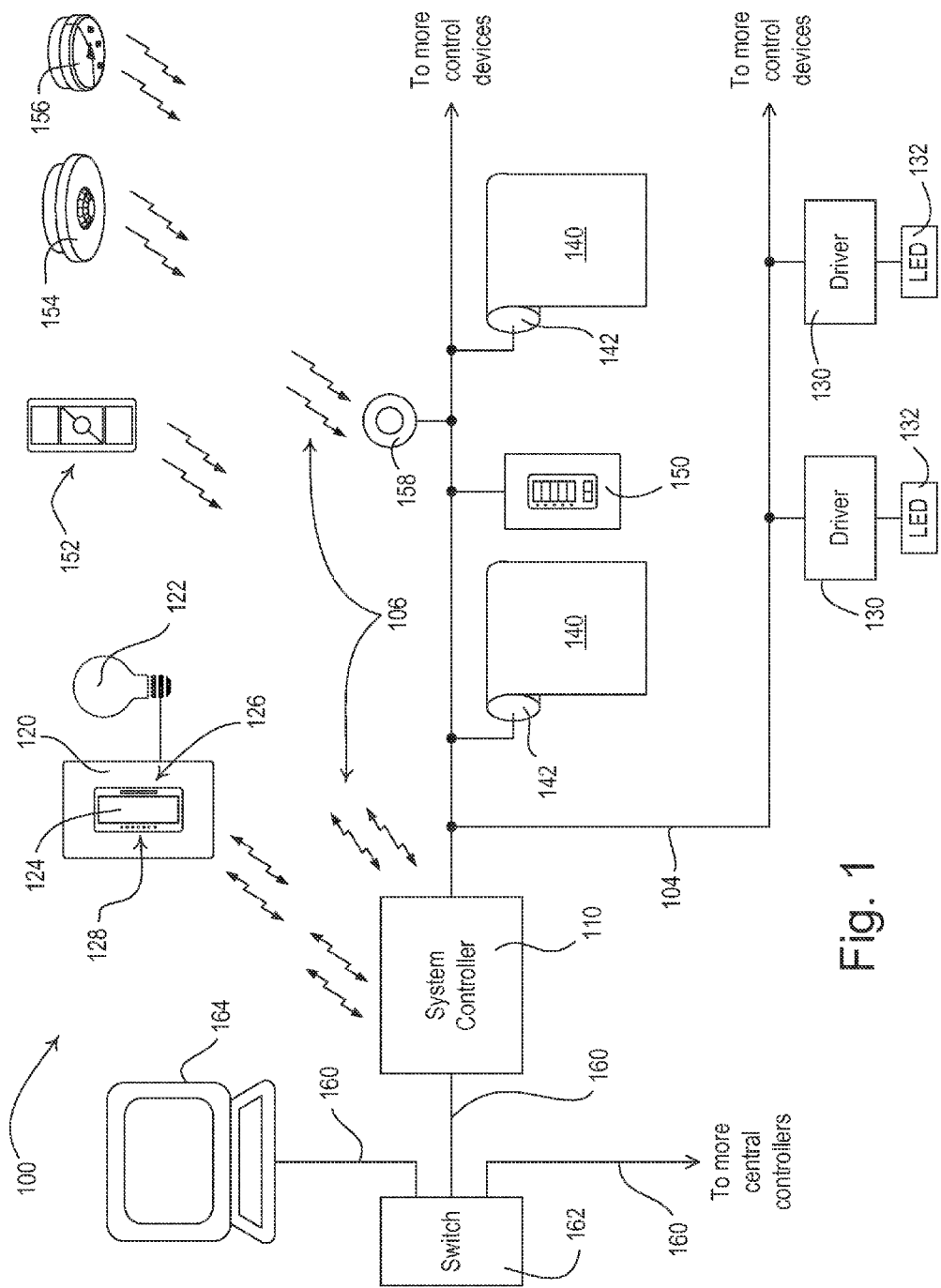
FIG. 1 is a simple diagram of an example load control system for controlling one or more electrical loads.

The foregoing summary, as well as the following detailed description, is better understood when read in conjunction with the appended drawings. Examples are shown in the drawings, in which like numerals represent similar parts throughout the several views of the drawings. The drawings and the description herein are, however, not intended to be limiting.

FIG. 1 is a simple diagram of an example load control system for controlling the amount of power delivered from an alternating-current (AC) power source (not shown) to one or more electrical loads. The load control system 100 may comprise a system controller 110 (e.g., a system controller or load controller) operable to transmit and receive digital messages via both wired and wireless communication links. For example, the system controller 110 may be coupled to one or more wired control devices via a wired digital communication link 104. The system controller 110 may be configured to transmit and receive wireless signals, e.g., radio-frequency (RF) signals 106, to communicate with one or more wireless control devices. The load control system 100 may comprise a number of control-source devices and a number of control-target devices. The control-source devices may include, for example, input devices operable to transmit digital messages in response to user inputs, occupancy/vacancy conditions, changes in measured light intensity, and/or other input information. The control-target devices may include, for example, load control devices operable to receive digital messages and/or control respective electrical loads in response to the received digital messages. A single control device of the load control system 100 may operate as both a control-source and a control-target device. The system controller 110 may be configured to receive digital messages from the control-source devices and may transmit digital messages to the control-target devices in response to the digital messages received, for example, from the control-source devices.

The load control system 100 may comprise a load control device, such as a dimmer switch 120, for controlling a lighting load 122. The dimmer switch 120 may be adapted to be wall-mounted in a standard electrical wallbox. The dimmer switch 120 may comprise a tabletop or plug-in load control device. The dimmer switch 120 may comprise a toggle actuator 124 (e.g., a button) and/or an intensity adjustment actuator 126 (e.g., a rocker switch). Successive actuations of the toggle actuator 124 may toggle, e.g., turn off and on, the lighting load 122. Actuations of an upper portion or a lower portion of the intensity adjustment actuator 126 may respectively increase or decrease the amount of power delivered to the lighting load 122 and thus may increase or decrease the intensity of the lighting load from a minimum intensity (e.g., approximately 1%) to a maximum intensity (e.g., approximately 100%). The dimmer switch 120 may comprise a plurality of visual indicators 128, e.g., light-emitting diodes (LEDs). The visual indicators 128 may be arranged in a linear array and may be illuminated to provide feedback of the intensity of the lighting load 122. Examples of wall-mounted dimmer switches are described in greater detail in U.S. Pat. No. 5,248,919, issued Sep. 28, 1993, entitled LIGHTING CONTROL DEVICE, and U.S. Patent Application Publication No. 2014/0132475, published May 15, 2014, entitled WIRELESS LOAD CONTROL DEVICE, the entire disclosures of which are hereby incorporated by reference.

The dimmer switch 120 may be configured to receive digital messages from the system controller 110 via the RF signals 106. The dimmer switch 120 may be configured to control the lighting load 122 in response to the received digital messages. Examples of dimmer switches operable to transmit and receive digital messages is described in greater detail in U.S. Patent Application Publication No. 2009/0206983, published Aug. 20, 2009, entitled COMMUNICATION PROTOCOL FOR A RADIO-FREQUENCY LOAD CONTROL SYSTEM, the entire disclosure of which is hereby incorporated by reference. The dimmer switch 120 may also, or alternatively, be coupled to the wired digital communication link 104.

The load control system 100 may comprise one or more remotely-located load control devices, such as light-emitting diode (LED) drivers 130 for driving respective LED light sources 132 (e.g., LED light engines). The LED drivers 130 may be located remotely, for example, in the lighting fixtures of the respective LED light sources 132. The LED drivers 130 may be configured to receive digital messages from the system controller 110 via the digital communication link 104. The LED drivers 130 may be configured to control the respective LED light sources 132 in response to the received digital messages. The LED drivers 130 may be coupled to a separate digital communication link, such as an Ecosystem® or digital addressable lighting interface (DALI) communication link. The load control system 100 may comprise a digital lighting controller coupled between the digital communication link 104 and the separate communication link. The LED drivers 132 may comprise internal RF communication circuits or be coupled to external RF communication circuits (e.g., mounted external to the lighting fixtures, such as to a ceiling) for transmitting and/or receiving the RF signals 106. The load control system 100 may further comprise other types of remotely-located load control devices, such as, for example, electronic dimming ballasts for driving fluorescent lamps.

The load control system 100 may comprise a plurality of daylight control devices, e.g., motorized window treatments, such as motorized roller shades 140. The load control system 100 may utilize the plurality of daylight control devices, for example, to control the amount of daylight entering the building in which the load control system 100 is installed. Each motorized roller shade 140 may comprise an electronic drive unit (EDU) 142. The electronic drive unit 142 may be located inside a roller tube of the motorized roller shade. The electronic drive units 142 may be coupled to the digital communication link 104, for example, to transmit and receive digital messages. The electronic drive units 142 may be configured to adjust the position of a window treatment fabric in response to digital messages received from the system controller 110 via the digital communication link. Each electronic drive units 142 may comprise an internal RF communication circuit or be coupled to an external RF communication circuit (e.g., located outside of the roller tube), for example, to transmit and/or receive the RF signals 106. The load control system 100 may comprise other types of daylight control devices, such as, for example, a cellular shade, a drapery, a Roman shade, a Venetian blind, a Persian blind, a pleated blind, a tensioned roller shade systems, an electrochromic or smart window, or other suitable daylight control device.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; hydraulic valves for use in radiators and radiant heating systems; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and/or an alternative energy controller.

The load control system 100 may comprise one or more input devices, e.g., such as a wired keypad device 150, a battery-powered remote control device 152, an occupancy sensor 154, and/or a daylight sensor 156. The wired keypad device 150 may be configured to transmit digital messages to the system controller 110 via the digital communication link 104 in response to an actuation of one or more buttons of the wired keypad device. The battery-powered remote control device 152, the occupancy sensor 154, and/or the daylight sensor 156 may be wireless control devices (e.g., RF transmitters) configured to transmit digital messages to the system controller 110 via the RF signals 106 (e.g., directly to the system controller 110). For example, the battery-powered remote control device 152 may be configured to transmit digital messages to the system controller 110 via the RF signals 106 in response to an actuation of one or more buttons of the battery-powered remote control device. The system controller 110 may be configured to transmit one or more digital messages to the load control devices (e.g., the dimmer switch 120, the LED drivers 130, and/or the motorized roller shades 140) in response to the digital messages received from the wired keypad device 150, the battery-powered remote control device 152, the occupancy sensor 154, and/or the daylight sensor 156.

The load control system 100 may further comprise a wireless adapter device 158 coupled to the digital communication link 104. The wireless adapter device 158 may be configured to receive the RF signals 106. The wireless adapter device 158 may be configured to transmit a digital message to the system controller 110 via the digital communication link 104 in response to a digital message received from one of the wireless control devices via the RF signals 106. For example, the wireless adapter device 158 may re-transmit the digital messages received from the wireless control devices on the digital communication link 104.

The occupancy sensor 154 may be configured to detect occupancy and vacancy conditions in the space in which the load control system 100 is installed. The occupancy sensor 154 may transmit digital messages to the system controller 110 via the RF signals 106 in response to detecting the occupancy or vacancy conditions. The system controller 110 may be configured to turn one or more of the lighting load 122 and/or the LED light sources 132 on and off in response to receiving an occupied command and a vacant command, respectively. The occupancy sensor 154 may operate as a vacancy sensor, such that the lighting loads are turned off in response to detecting a vacancy condition (e.g., not turned on in response to detecting an occupancy condition). Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 156 may be configured to measure a total light intensity in the space in which the load control system is installed. The daylight sensor 156 may transmit digital messages including the measured light intensity to the system controller 110 via the RF signals 106 for controlling the intensities of one or more of the lighting load 122 and/or the LED light sources 132 in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., power meters, energy meters, utility submeters, utility rate meters, etc.), central control transmitters, residential controllers, commercial controllers, industrial controllers, or any combination of input devices.

The system controller 110 may be operable to be coupled to a network, such as a wireless or wired local area network (LAN) via a network communication bus 160 (e.g., an Ethernet communication link), for example, for access to the Internet. The system controller 110 may be connected to a router 162 (or Ethernet switch) via the network communication bus 160 for allowing the system controller 110 to communicate with additional system controllers for controlling additional electrical loads. The system controller 110 may be wirelessly connected to the network, e.g., using Wi-Fi technology. The system controller 110 may be configured to communicate via the network with one or more network devices, such as a smart phone (e.g., an iPhone® smart phone, an Android® smart phone, or a Blackberry® smart phone), a personal computer 164, a laptop, a tablet device, (e.g., an iPad® hand-held computing device), a Wi-Fi or wireless-communication-capable television, and/or any other suitable Internet-Protocol-enabled device. The network device may be operable to transmit digital messages to the system controller 110 in one or more Internet Protocol packets. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The operation of the load control system 100 may be programmed and/or configured using the personal computer 164 or other network device. The personal computer 164 may execute a graphical user interface (GUI) configuration software for allowing a user to program how the load control system 100 may operate. The configuration software may generate a load control database that defines the operation of the load control system 100. For example, the load control database may include information regarding the operational settings of different load control devices of the load control system (e.g., the dimmer switch 120, the LED drivers 130, and/or the motorized roller shades 140). The load control database may include information regarding associations between the load control devices and the input devices (e.g., the wired keypad device 150, the battery-powered remote control device 152, the occupancy sensor 154, and/or the daylight sensor 156), and information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosures of which are hereby incorporated by reference.

The system controller 110 may be configured to select a preset (e.g., a scene) for controlling one or more of the electrical loads of the load control system 100. A preset may be a predefined setting that may be defined at the time of commissioning of the load control system 100. For example, one of the actuators of the wired keypad device 150 and/or the battery-powered remote control device 152 may allow for the selection of a lighting preset and/or a motorized window treatment preset. The preset configuration may be included in preset data. The preset data may include, for example, a level, a fade time, and/or a delay time, for one or more load control devices. The preset level may be a lighting intensity level, a window treatment level (e.g., level of the bottom of the window shade), or another preset level to which a load control device may control an electrical load. The fade time may be the length of time over which the lighting intensity level may be changed, the length of time over which the window treatment level may be changed, or another length of time over which a load control device may control an electrical load to change to the preset level. The fade time may be indicated by a fade rate, which may be the speed at which the preset level may be changed. The delay time may be the period of time that a device may delay before the preset is implemented.

The lighting preset may be characterized by a target light intensity for one or more of the lighting loads 122 and the LED light engines 132. The motorized window treatment preset may be characterized by a target position for one or more of the motorized roller shades 140. The lighting preset and/or the motorized window treatment preset may be characterized by one or more fade times (e.g., the length of the time period over which the lighting loads 122, 132 are adjusted from the present intensity to the target intensity or over which the position of the motorized roller shades 140 are adjusted). The fade time may be the same or different for each controlled electrical load of the lighting preset and/or the motorized window treatment preset. The lighting preset and/or the motorized window treatment preset may be characterized by a delay time (e.g., the length of the time period from when the preset selection is made until the controlled loads begin to adjust the light intensity or motorized window treatment position).

The load control devices may each store a device database (e.g., a partial load control database). The device database may predefine the operation of that load control device in response to one or more presets. The device database may store operation information of the load control devices. For example, the device database may store commands, preset data, and/or multi-output commands. The device database may include preset data for each preset. The preset data may comprise the preset configuration, such as the level (e.g., lighting intensity level, window treatment level, etc.), the fade time, and/or the delay time, for one or more load control devices. The system controller 110 may be configured to assign each load control device a unique address for load control and may transmit the respective device databases to the associated load control devices. The system controller 110 may assign each load control device and/or transmit the device databases during a commissioning procedure of the load control system 100. During the commissioning procedure, the system controller 110 and/or the load control devices may be in a commissioning mode (e.g., setup mode) for configuring one or more devices in the load control system 100.

The device database may be transmitted to one or more load control devices of the load control system 100. The load control devices of the load control system 100 may download the device database and store the device database in memory. The load control devices may download the device database during commissioning and/or upon user request or command. The device database may include the preset data, which may be referenced by the load control devices upon receipt of a preset command.

The system controller 110 may be configured to transmit (e.g., broadcast) a preset command to the load control devices of the load control system 100. The transmission of the preset command may be in response to the selection of a preset. The preset command may be transmitted in a single digital message. The preset command may describe the selected preset or operation of the load control devices according to the selected preset. For example, the preset command may include a preset identifier (e.g., a preset name or number). The preset command may include a load control device identifier with the preset identifier. The preset identifier may be 1 byte and a load control device identifier may be 5 bytes. A preset command (e.g., a preset message) may be, for example, 30-35 bytes. The number of bits in a preset may vary, for example, based on the number of load control devices. The load control device may access the device database and lookup the preset identified in the preset command to determine how to operate according to a preset identified in a preset command received from the system controller 110. The digital message format to communicate a preset command may be different than the digital message format used to communicate a multi-output goto-level command. A preset command may be downloaded by each device prior to the use of the preset command. A multi-output goto-level command may be a group message that is sent at the runtime of the command comprising parts addressed to specific load control devices.

The system controller 110 may be configured to transmit a multi-output command (e.g., a multi-output goto-level command) to one or more of the load control devices of the load control system 100 (e.g., via the digital communication link 104). The multi-output command may be transmitted in response to the selection of the preset. The multi-output command may define the operation of one or more load control devices according to the preset. The multi-output command may include the information that may be used by a load control device to operate according to the selected preset. For example, the multi-output command may define the preset data by which one or more load control devices may operate. The multi-output command may allow a load control device to determine the defined preset without the load control device having to download the preset data (e.g., in the device database), or one or more portions thereof, prior to receiving the multi-output command (e.g., during commissioning of the load control system 100).

A single multi-output command may be transmitted in a single digital message or multiple digital messages. For example, a digital message transmitted on the wired digital communication link 104 may comprise 128 bytes and may transmit over a time period of approximately 50 milliseconds. The multi-output command may include information regarding preset data for multiple load control devices.

FIGS. 2A-2C illustrate diagrams of example digital messages that include multi-output commands. FIG. 2A illustrates an example digital message having a single-level single-fade multi-output command 200. The single-level single-fade multi-output command 200 may be generated and/or transmitted to a plurality of load control devices to control one or more of the load control devices to a single intensity level (or shade position) with a single fade time. The single-level single-fade multi-output command 200 may include a starting address block 202, a bitmap block 204, a single level block 206, and a single fade time block 208. Each load control device that receives the single-level single-fade multi-output command 200 may use the data in the starting output address block 202 and/or the bitmap block 204 to determine if the load control device should respond to the multi-output command. The decision to respond to the multi-output command may be based on level data in the single level block 206 and/or fade data in the single fade time block 208 of the single-level single-fade multi-output command 200.

The output address for a load control device may be identified in the starting output address block 202. The output address for a load control device may be grouped by type of device (e.g., window treatments may be contiguous, light controllers may be contiguous, etc.). Additional load control devices may be identified in the bitmap block 204. The load control device identified in the starting output address block 202 and/or the additional devices identified in the bitmap block 204 may use the level data in the single level block 206 to perform or not perform the dimming level identified. Similarly, the load control device identified by in the starting output address block 202 and/or the additional devices identified in the bitmap block 204 may use the fade data in the single fade time block 208 to perform or not perform the fade time identified.

The order of the bits of the data in the bitmap block 204 may indicate the specific output addresses of load control devices. For example, starting with the load control device identified in the starting output address block 202, each bit in the bitmap block 204 may indicate a control command to a different load control device in a sequence. The commands may indicate whether the load control devices should respond to the single-level single-fade multi-output command 200. For example, each bit of the data in the bitmap block 204, or within a predefined number of bits in the bitmap, may include a logic indicator directing a load control device to respond or to not respond to the single-level single-fade multi-output command 200. For example, a logic one (e.g., one-bit indicator having a value of one) may indicate for a load control device to respond to the single-level single-fade multi-output command 200, and/or a logic zero (e.g., one-bit indicator having a value of zero) may indicate for the load control device not to respond to the single-level single-fade multi-output command 200. The load control device having the output address for load control in the starting output address block 202 may automatically implement the preset data in the single-level single-fade multi-output command 200, or the load control device may determine whether to implement the preset data based on a corresponding bit, or sequence of bits, in the bitmap 204 (e.g., the first bit in the sequence).

In an example, if the first bit of the data in the bitmap block 204 is a logic one, the load control device having the output address for load control equal to the output address in the starting output address block 202 of the single-level single-fade multi-output command 200 (e.g., output address for load control 00001) may control the respective electrical load according to the data in the single level block 206 and the single fade time block 208 of the single-level single-fade multi-output command 200. If the second bit of the data in the bitmap block 204 is a logic zero, the load control device having, for example, the output address for load control immediately after the output address in the starting output address block 202 of the single-level single-fade multi-output command 200 (e.g., output address for load control 00002) may not actuate the respective electrical load in response to the single-level single-fade multi-output command 200. In another example, the load control device having the output address for load control in the starting output address block 202 may automatically implement the preset data in the single-level single-fade multi-output command 200 and the first bit of the bitmap block 204 may indicate whether a next load control device should implement the preset data in the multi-output command 200.

The bitmap block 204 may continue to control the load control devices in a sequence based on the load control output address for load control. The first load control device in the sequence may be the load control device having the output address for load control equal to the output address in the starting output address block 202. The data in the bitmap block 204 may include, for example, 64 bytes, such that the system controller 110 may control 512 load control devices using the single-level single-fade multi-output command 200. A bitmap of 64 bytes is 512 bits as 1 byte is equal to 8 bits. Each bit may refer to one load control device and the order may determine the load control device that is controlled.

The load control devices may receive a command 200. The load control device may determine the starting output address 202 of the command 200. The load control device may calculate the difference between the output address of the load control device and the starting output address 202. Based on the calculated difference, the load control device may determine the corresponding bit, or sequence of bits, in the bitmap block 204 for the load control device. Based on the corresponding bit, or sequence of bits, the load control device may perform or not perform according to the single-level single-fade multi-output command 200, as identified in the level block 206 and/or fade block 208.

The system controller 110 may generate the multi-output command 200 by choosing a load control device starting output address for a group of load control devices to be controlled according to a selected preset. For example, the system controller 110 may identify devices in a room having certain output addresses. The system controller may determine the load control devices to include in the bitmap block 214 based, for example, on user preference, user input, preset data, etc. The system controller 110 may determine the output address for the load control device at the starting output address. The system controller 110 may input the load control device starting output address into the starting output address block 202. The system controller 110 may determine the sequence of load control devices and the associated output addresses and which output addresses in the sequence are to be controlled according to the preset. The system controller 110 may indicate the load control devices to be controlled according to the preset and set the corresponding bit, or bits, in the bitmap block 204 for each load control device in the sequence, such that the appropriate load control devices implement the selected preset. The system controller 110 may use the bitmap block 204 to communicate the preset data to the sequence of load control devices.

FIG. 2B illustrates an example digital message having a multi-level single-fade multi-output command 210. The multi-level single-fade multi-output command 210 may be transmitted to a plurality of load control devices to control one or more load control devices to different intensity levels (or shade positions) using a single fade time. The multi-level single-fade multi-output command 210 may include a starting output address block 212, a bitmap block 214, multiple level blocks 216a-216n, and a single fade time block 218. For example, the system controller 110 may use the multi-level single-fade multi-output command 210 to control fifty load control devices using the multi-level single-fade multi-output command 210, as shown in FIG. 2B. The data in the bitmap block 204 may include, however, 64 bytes, such that the system controller 110 may control 512 load control devices using the single-level single-fade multi-output command 200. A bitmap of 64 bytes is 512 bits as 1 byte is equal to 8 bits. Each bit may refer to one load control device and the order may determine the load control device that is controlled.

As with the bitmap block 204 of the single-level single-fade multi-output command 200 shown in FIG. 2A, the order of the bits of the data in the bitmap block 214 of the multi-level single-fade multi-output command 210 may indicate the specific output addresses of load control devices that may respond to the multi-level single-fade multi-output command. For example, each bit in the bitmap 214, or within a predefined number of bits in the bitmap, may include, for example, a logic indicator directing a load control device to respond or to not respond to the information in the multi-level single-fade multi-output command 210.

The intensity level to which each of the load control devices identified in the bitmap block 214 will be controlled may be indicated in the multiple level blocks 216a-216n. Each of the load control devices identified in the sequence of bits in the bitmap block 214 may correspond to a respective level block 216a-216n. Each level block 216a-216n may comprise one or more bits to indicate intensity and/or shade level. The order of the devices instructed in the bitmap 214 may correspond to the order of devices in the multiple level blocks 216a-216n. For example, each bit in the bitmap 214, or within a predefined number of bits in the bitmap, may indicate for a load control device to apply the fade 218 and a corresponding intensity level (or shade position) indicated in the corresponding level block 216. For example, the first bit identified in the bitmap block may correspond to the first level. The corresponding level for a load control device may be identified by counting the difference from the first bit identified in the bitmap block 214, and counting that equivalent distance from the first level block.

In an example, if the first bit of the data in the bitmap block 214 is a logic one, the load control device having the output address for load control equal to the output address in the starting output address block 212 of the multi-level single-fade multi-output command 210 (e.g., output address for load control 00001) may control the respective electrical load according to the data in the level block 216a and the single fade time block 218 of the multi-level single-fade multi-output command 210. If the second bit of the data in the bitmap block 214 is a logic zero, the load control device having, for example, the output address for load control immediately after the output address in the starting output address block 212 of the multi-level single-fade multi-output command 210 (e.g., output address for load control 00002) may not actuate the respective electrical load in response to the multi-level single-fade multi-output command 210. If the $n^{th}$ bit of the data in the bitmap block 214 is a logic one, the load control device having the output address for load control equal to the output address in the starting output address block 212 plus n of the multi-level single-fade multi-output command 210 (e.g., output address for load control 00001+n) may control the respective electrical load according to the data in the level block 216n and the single fade time block 218 of the multi-level single-fade multi-output command 210.

The bitmap block 214 may continue to control the load control devices in a sequence based on the load control output address for load control. The first load control device in the sequence may be the load control device having the output address for load control equal to the output address in the starting output address block 212. The data in the bitmap block 214 may include, for example, 64 bytes, such that the system controller 110 may control 512 load control devices using the multi-level single-fade multi-output command 210. A bitmap of 64 bytes is 512 bits as 1 byte is equal to 8 bits. Each bit may refer to one load control device and the order may determine the load control device that is controlled. For example, the load control devices may receive a command 210. The load control device may determine the starting output address 212 of the command 210. The load control device may determine the difference between the output address of the load control device and the starting output address 212. Using this difference, the load control device may calculate the corresponding instruction in the bitmap block 214 by adding the calculated difference to the output address identified in the starting output address block 212.

The load control device may determine which of the corresponding level blocks 216a-216n in the multi-level single fade command 210 identify the appropriate level to apply to the load control device. In an example, the load control device may determine the level to apply to the load control device by counting the difference determined in the bits and applying that number to the level blocks 216a-216n. For example, if the difference in bits is determined to be two, the load control device may determine the level by counting two level blocks from the first level block 216a (e.g., 216c). Each level block may include one or more bits that indicate the preset level for the respective load control device. The level blocks that correspond to the load control devices that are instructed not to respond to respond to the command 210 may include the logical zero bit, a NULL value, or another bit or series of bits that identify that the load control device is not to respond to respond to the command 210 by implementing a level or fade time.

Load control devices that are not identified in the bitmap block 214 for implementing the preset data (e.g., level or fade time) may not have an intensity level indicated in the multiple level blocks. For example, a load control device having an output address for load control in the bitmap block 214 that corresponds to an instruction to not respond to the command 210 (e.g., by not implementing the preset data in the command 210) may not have an intensity level in the level blocks. If the first and second bits of the data in the bitmap block 214 are a logic zero and a logic one, respectively, the first one of the multiple level blocks 216a may include the intensity level to which the load control device having the output address for load control immediately after the output address in the starting output address block 212 may be controlled. The load control devices that are instructed to apply the preset data in the command 210 may calculate their respective positions within the subset of load control devices instructed to respond to the command 210 within the bitmap block 214 and may look to the same position in the level blocks for the level to be executed. For example, a load control device having the third output address for load control (e.g., output address for load control 00003) may be the second load control device in the bitmap block 214 instructed to apply the preset data in the command 210 (e.g., the second logic one bit in the bitmap block 214) and may identify the second level block for the preset level to be implemented by the load control device.

FIG. 2C illustrates a digital message having a multi-level multi-fade multi-output command 220. The multi-level multi-fade multi-output command 220 may be transmitted to a plurality of load control devices to control one or more load control devices to different intensity levels (or shade positions) using different fade times. The multi-level multi-fade multi-output command 220 may include multiple output address for load control blocks 222a-222n, respective level blocks 226a-226n, and respective fade time blocks 228a-228n. A load control device having one of the output addresses in the output address for load control blocks 222a-222n of the multi-level multi-fade multi-output command 220 may respond to the multi-level multi-fade multi-output command 220 using the intensity levels in the respective level blocks 226a-226n and the fade rates in the respective fade time blocks 228a-228n. For example, the system controller 110 may be able to control nineteen load control devices using the multi-level multi-fade multi-output command 220. A packet size may be 128 bytes. In a multi-level multi-fade multi-output command 220, each load control device may be allocated two bytes for the output identification (e.g., output address) two bytes for level information, and two bytes for fade information, with seven bytes for header information and one byte for additional information (e.g., checksum).

The level blocks 228a-228n may each identify a level to which a corresponding load control device identified in the multi-output command 220 may be controlled. The fade time blocks 228a-228n may each identify a fade time for a corresponding load control device identified in the multi-output command 220. For example, the output address identified in 222a may be controlled to apply the intensity or shade level identified in level block 226a at the fade time identified in 228a. Similarly, the output address identified in 222n may be controlled to apply the intensity or shade level identified in level block 226n at the fade time identified in 228n. Each level block 226a-226n may comprise one or more bits to indicate intensity and/or shade level. For example, a level block 226a-226n may include a number of bits (e.g., 16 bits, 2 bytes) for the intensity and/or level, depending on the level of accuracy for the message configuration. Each fade block 228a-228n may comprise one or more bits to indicate fade time. For example, a fade block 228a-228n may include a number of bits (e.g., 16 bits, 2 bytes) for the fade time, depending on the level of accuracy for the message configuration. The levels and/or fades indicated in the multi-output commands 200, 210, 220 in FIGS. 2A-2C may be absolute or relative values.

Though not shown in FIGS. 2A-2C, the multi-output commands 200, 210, 220 may include or otherwise indicate the delay time for each of the load control devices if the preset includes a delay time. The load control devices may each delay for the delay time after receiving the multi-output command before executing the preset. To reduce the amount of data transmitted in each multi-output command, the delay time may not be included in the multi-output commands 200, 210, 220 shown in FIGS. 2A-2C. If a preset includes a delay time, the system controller 110 may delay for the appropriate delay time after the preset is selected before transmitting the multi-output command to the load control devices. If the preset includes multiple delay times, the system controller 100 may send out multiple multi-output commands at the various delay times.

The multi-output commands 200, 210, 220 may be stored (e.g., in the device database) as a preset at the load control device. Though not shown in FIGS. 2A-2C, the multi-output commands 200, 210, 220 may include or otherwise indicate a preset (e.g., identification number and/or name) that may be used to reference the preset data in the multi-output commands 200, 210, 220. For example, the multi-output commands 200, 210, 220 may comprise preset blocks. The preset blocks may be located before or after the starting output address block 202, 222, after the information blocks, such as the fade or level blocks, or after the bitmap blocks 204, 214. The multi-output commands 200, 210, 220 may define the preset data, including the load control devices that may be included in the preset, that may be referenced in a preset command at a later time. The preset may be stored (e.g., in the device database) with the preset data in the multi-output commands 200, 210, 220 for being referenced at a later time in a preset command that identifies the preset.

The system controller 110 may be configured to decide which of a preset command and a multi-output command may be transmitted to the load control devices of the load control system 100 in response to the selection of a preset. As the preset command may be used by a load control device to reference a device database after the load control device has stored the device database that includes the preset data for the preset, the multi-output command may be more efficient. For example, the system controller 110 may be configured to analyze the data regarding each preset (e.g., of the load control database) during the commissioning procedure. The system controller 110 may be configured to decide which of a preset command and a multi-output command may be transmitted depending upon the content of the preset data defining the operation of the preset and the number of load control devices involved with the preset. The system controller 110 may decide to transmit a multi-output command if the number of digital messages to be transmitted for the multi-output command is less than or equal to a maximum number $N_{MAX}$ of digital messages. The maximum number $N_{MAX}$ of digital messages may be selected such that the total amount of time to transmit the maximum number $N_{MAX}$ of digital messages is less than or equal to a popcorn notice time $T_{POPCORN}$. The popcorn notice time $T_{POPCORN}$ may be the length of time between the moments when two lighting loads turn on that is noticeable to a human viewer. For example, if each digital message takes approximately 50 milliseconds to transmit, the maximum number $N_{MAX}$ of digital messages may be one, when the popcorn notice time $T_{POPCORN}$ is 50 milliseconds.

The system controller 110 may decide to transmit a multi-output command (e.g., rather than downloading the preset data in a device database at the load control devices in the preset and sending a preset command), if the preset data for a preset allows one of the multi-output commands 200, 210, 220 shown in FIGS. 2A-2C to be transmitted in a single digital message. The size of a single digital message may vary by the number of load devices and/or the amount of information sent (e.g., 20 bytes to 128 bytes, and a single-level single-fade multi-output command 200 may be 80 bytes, a multi-level single-fade multi-output command 210 may be 128 bytes, and a multi-level multi-fade multi-output command 220 may be 128 bytes). The load control devices may store the multi-output command in the respective device databases. The stored multi-output command may also be stored in the system controller 110. The system controller 110 may adapt the multi-output commands into alternate or additional presets. For example, the system controller 110 may recognize that multi-output commands are repeatedly transmitted more than a predetermined number of times. The system controller 110 may assign a preset to the multi-output command and send the preset with the multi-output command for being referenced in a preset command.

The system controller 110 may decide to transmit a multi-output command (e.g., rather than downloading the preset data in a device database at the load control devices in the preset and sending a preset command) in response to the selection of a preset if the preset includes a single level and a single fade time, or multiple levels and a single fade time. If the preset includes multiple levels and a single fade time, the system controller 110 may decide to transmit a multi-output command (e.g., rather than a preset command) in response to the selection of the preset if the preset involves less than or equal to a predefined number of load control devices (e.g., 50 load control devices). The predefined number of load control devices may be the number of load control devices that the multi-output command may control in a single message or in less messages than may be used to otherwise transmit the preset using the preset command.

If the preset includes multiple levels and a single fade time, but involves more than the predefined number of load control devices (e.g., 50 load control devices), the system controller 100 may decide to transmit a preset command (e.g., rather than a multi-output command) and/or the preset data in the load control database in response to the selection of the preset. The system controller 110 may add the appropriate data regarding the preset data defining the operation of the selected preset to the device databases of the involved load control devices. The system controller 110 may transmit the device databases to the load control devices after the system controller has analyzed the presets in the load control database.

One or more of the control devices (e.g., in addition to or other than the system controller 110) may be configured to transmit multi-output commands to the load control devices of the load control system 100. For example, it may be desirable to reduce the delay time from an input received by an input device (e.g., an actuation of a slider of a slider control unit) to when the appropriate lighting loads are adjusted. Accordingly, rather than transmitting a digital message to the system controller 110 in response to the actuation of the slider, the slider control unit may transmit a multi-output command directly to the load control devices of the load control system 100. The system controller 110 may be configured to transmit a device database to the slider control units (or other input devices) during the commissioning procedure. The device database may include the appropriate multi-output commands. Upon receiving the device database, the slider control units may have the multi-output commands stored in memory for use during operation in response to actuations of the slider.

The system controller 110 may operate to analyze the preset data and make a determination regarding the transmission of preset commands and/or multi-output commands during the commissioning procedure (e.g., setup prior to operation of the load control devices in the load control system 100), as described herein. Additionally, or alternatively, the system controller 110 may transmit multi-output commands to the load control devices of the load control system 100 after the commissioning procedure is completed. The system controller 110 may begin to transmit preset commands and/or multi-output commands to one or more of the load control devices at some time after the commissioning procedure is completed. For example, the system controller 110 may transmit a multi-output command to the load control devices of the load control system 100 the first time a preset is selected after commissioning. The load control devices receiving the multi-output command may use the multi-output command to define the preset data at the load control device and the system controller 110 may transmit preset commands to the load control devices when that preset is subsequently selected. The load control devices that receive the initial multi-output command may store the appropriate preset data regarding that preset (e.g., the level, the fade time, and the delay time) in the device database stored in each load control device. The appropriate preset data may correspond to a load control device.

The system controller 110 may be configured to decide which of a preset command and a multi-output command may be transmitted after the commissioning procedure is completed (e.g., during operation of the load control system 100). For example, the first time a preset is selected after the commissioning procedure is completed, the system controller 110 may transmit a multi-output command to the load control devices of the load control system 100. Before transmitting the multi-output command, the system controller 110 may analyze the preset data and determine whether a preset command or multi-output command should be transmitted. When a multi-output command is transmitted, the system controller 110 may set a save-data flag in the presently transmitted multi-output command. In response to receiving a multi-output command having the save-data flag set, the load control devices may store the appropriate preset data (e.g., the preset data defined in the multi-output command for the device) regarding that preset in the device database stored in the load control device, such that the load control device may be able to process preset commands transmitted in response to future selections of that preset. For example, the multi-output command may include a preset command (e.g., a preset name or number) for referencing the preset data defined in the multi-output command in subsequent data messages. When the multi-output command is transmitted, the system controller 110 may set the save-data flag when the system controller 110 determines that a preset command may be subsequently transmitted (e.g., in response to future selections of the preset).

The load control devices may be configured to decide whether to store the appropriate preset data in the device database, for example, rather than having the system controller 110 decide whether to set a save-data flag in each transmitted multi-output command. A load control device may decide to store the appropriate preset data in the device database. The appropriate preset data for the load control device may be stored if the load control device receives a multi-output command and the number of digital messages used to transmit that multi-output command exceeds the maximum number $N_{MAX}$ of digital messages (e.g., greater than one digital message). The system controller 110 may determine that preset commands may be transmitted in response to future selections of the preset. The system controller 110 may be configured to transmit preset commands and the load control devices may be configured to receive preset commands for that preset after the transmission of the initial multi-output command.

The system controller 110 may operate in an initial operation mode, for example, after the commissioning procedure is completed. During the initial operation mode, the system controller 110 may transmit a multi-output command to the load control devices when a preset is selected. The load control devices that receive the initial multi-output command may store the appropriate preset data regarding that preset (e.g., preset data corresponding to the load control device) in the device database stored in the load control device.

The system controller 110 may be configured to transmit configuration messages, including the device databases, and/or multi-output commands defining the operation of the load control devices in response to the presets, to the load control devices when one or more devices in the system 100 are in an idle mode. Devices may be in idle mode, for example, when the communication links of the devices are idle (e.g., when digital messages are not being transmitted from or received at a load control device). The configuration messages may be transmitted when the communication links of the entire load control system 100 are idle (e.g., when no digital messages are being transmitted on the wired digital communication link 104 and no RF signals 106 are being transmitted). When the load control devices have received the device databases (e.g., in response to receiving the multi-output commands or the configuration messages), the system controller 110 may begin to operate in a normal mode in which the system controller transmits preset commands to the load control devices when presets are selected.

Figure 3A:
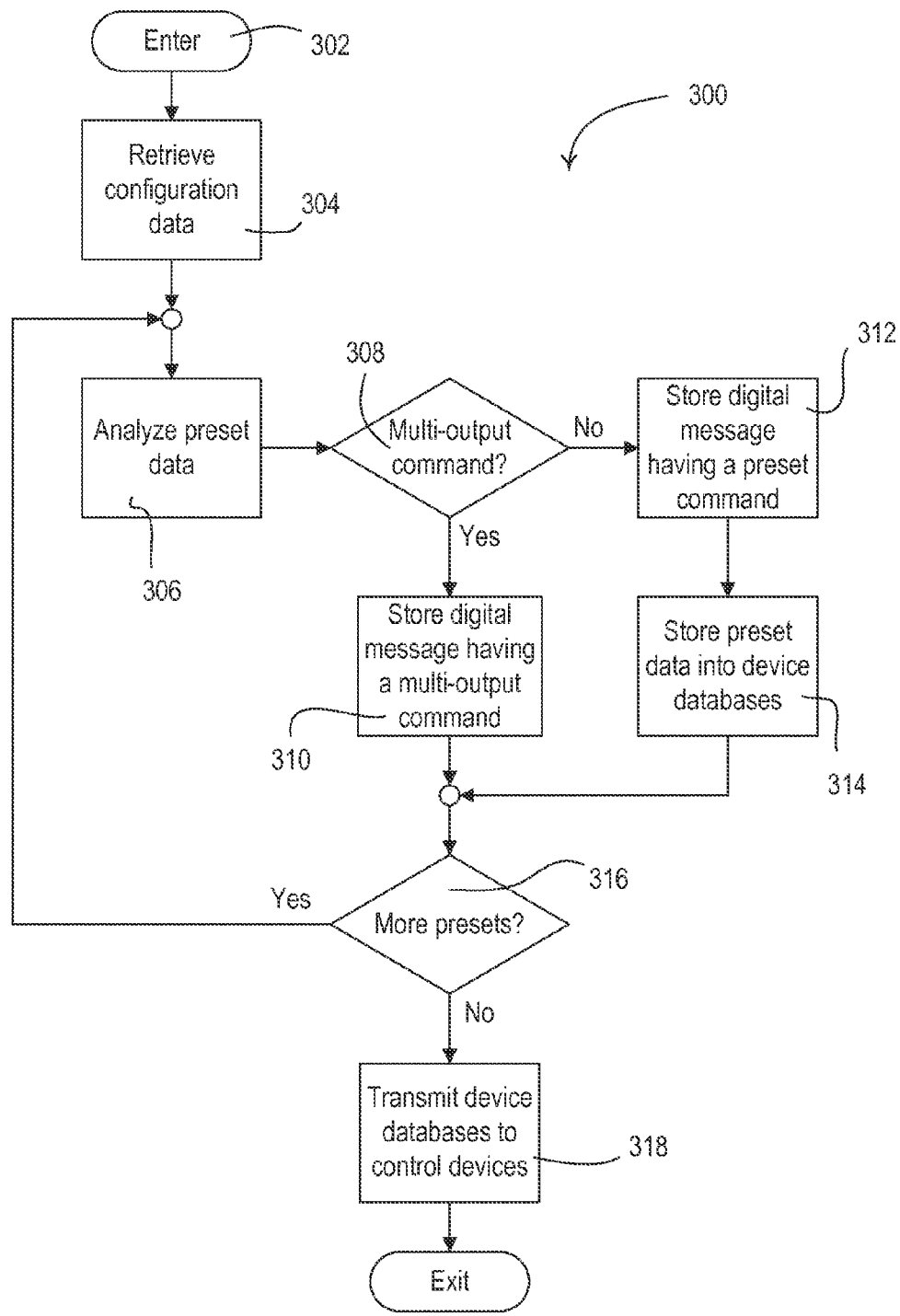
FIGS. 3A-3C show simplified flowcharts of example procedures executed by a system controller and/or load control devices of a load control system in order to select presets in the load control system.
Figure 3B:
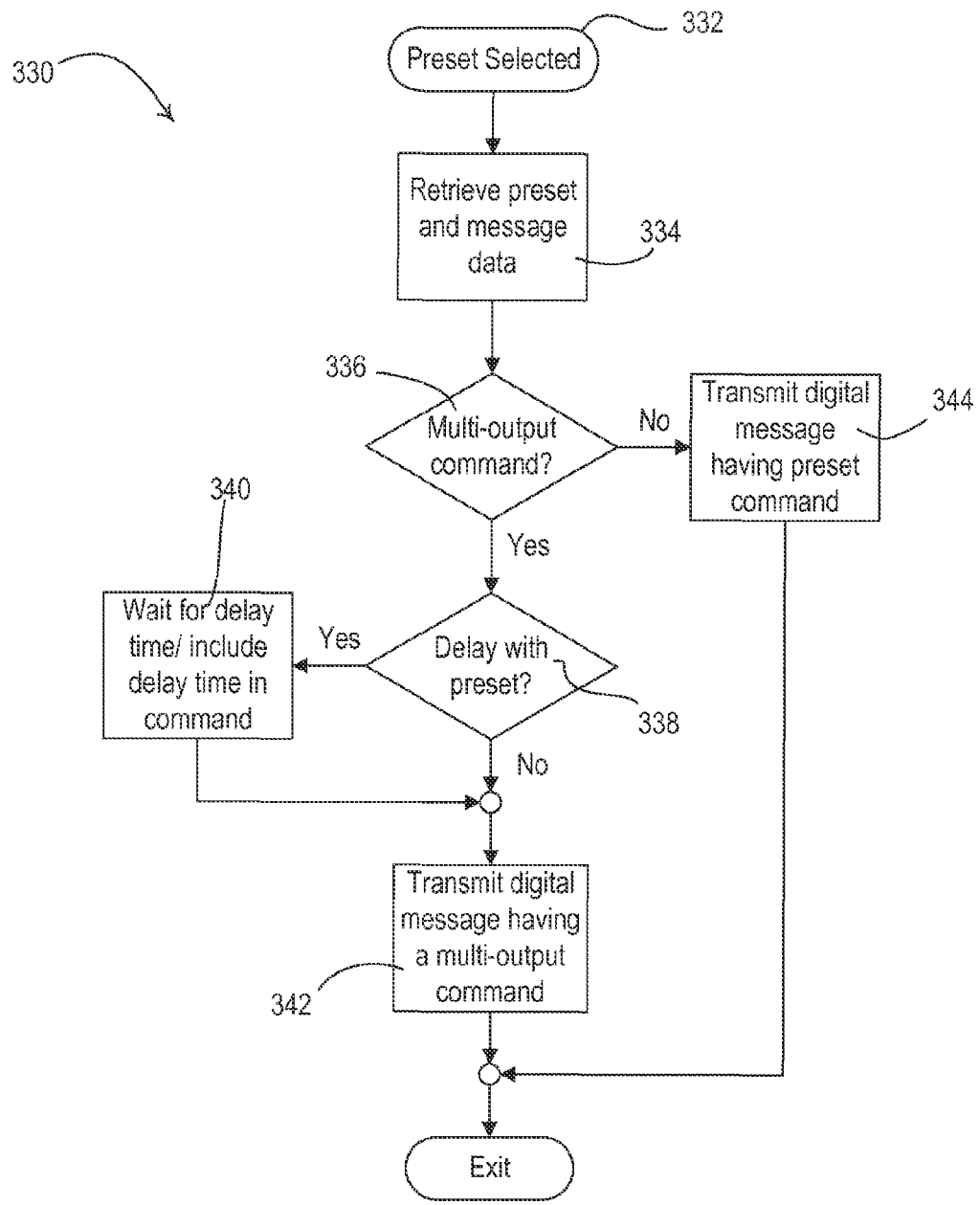
Figure 3C:
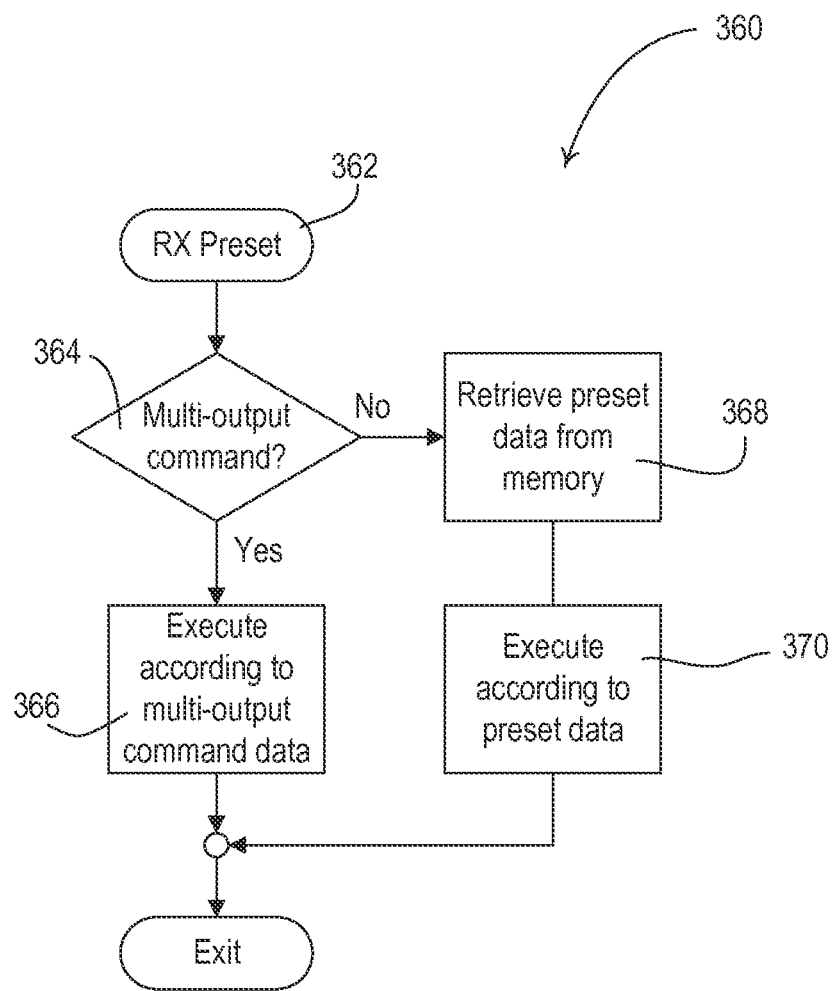

FIGS. 3A-3C illustrate simplified flowcharts of example procedures executed by a system controller and/or load control devices of a load control system (e.g., the load control system 100 shown in FIG. 1) to select presets in the load control system. According to the procedures of FIGS. 3A-3C, the system controller may be configured to analyze the preset data regarding each preset of the load control database during a commissioning procedure and decide which of a preset command and a multi-output command may be transmitted depending upon the content of the preset data and the number of load control devices involved with the preset, for example.

FIG. 3A is a simplified flowchart of an example of a preset message configuration procedure 300. The preset message configuration procedure 300 may be executed by the system controller, for example, during a configuration and/or commissioning procedure for the load control system at 302. The system controller may retrieve configuration data at 304 (e.g., by receiving a load control database from the personal computer 164). The system controller may analyze the preset data for the preset in the load control database at 306. The system controller may determine whether to transmit a preset command or a multi-output command at 308. For example, the system controller may determine if a single digital message including one of the multi-output commands 200, 210, 220 shown in FIGS. 2A-2C may be transmitted. If a single digital message including a multi-output command may be transmitted at 308, the system controller may store a digital message having a multi-output command for that preset in memory at 310. If a single digital message including a multi-output command cannot be transmitted at 308, the system controller may store a digital message having a preset command for that preset in memory at 312. The system controller may store preset data (e.g., the level, fade time, delay, etc.) in the device databases for the involved load control devices at 314. If there are more presets to analyze in the load control database at 316, the system controller may analyze the preset data for the next preset at 306, and the system controller may determine whether to transmit a preset command or a multi-output command for that preset at 308. If there are no other presets to analyze in the load control database at 316, the system controller may transmit the devices databases to the load control devices at 318, and the preset message configuration procedure 300 may exit.

FIG. 3B is a simplified flowchart of an example of a controller preset procedure 330, which may be executed by the system controller, for example, in response to the selection of a preset at 332. For example, the system controller 110 may receive a digital message indicating the selection of the preset from the wired keypad device 150 and/or the battery-powered remote control device 152 at 332. At 334, the system controller may retrieve the preset and/or message data from memory for the preset selected at 332. If the preset and message data indicates that a multi-output command is to be transmitted at 336, the system controller may determine if the preset includes a delay time at 338. If so, the system controller may wait for the delay time indicated in the preset and message data at 340. In another example, the system controller may include the delay time corresponding to each load control device in the digital message at 340 for the load control device to wait the delay time. The system controller may transmit a digital message at 342. The digital message may include the multi-output command. The system controller may send the digital message before the controller preset procedure 330 exits. If the preset does not include a delay time at 338, the system controller may transmit a digital message including the multi-output command at 342, and the controller preset procedure 330 may exit. If the preset and message data indicates that a preset command is to be transmitted at 336, the system controller may transmit a digital message including the preset command at 344 and the controller preset procedure 330 may exit.

FIG. 3C is a simplified flowchart of an example of a device preset procedure 360. The device preset procedure 360 may be executed by the load control devices of the load control system, for example, in response to the selection of a preset at 362. For example, the load control device may receive a digital message from the system controller 110 at 362. The digital message may include a preset command or a multi-output command. If the received digital message includes a multi-output command at 364, the load control device may execute according to the preset data included in the multi-output command at 366, and the device preset procedure 360 may exit. For example, the load control device may retrieve a level and a fade time from the multi-output command. The load control device may control the intensity of a controlled lighting load to the level using the fade time at 366. Additionally, or alternatively, at 366, a motorized window treatment may control the shade level according to the multi-output command. The motorized window treatment may move the shade level to a level (e.g., intensity level) and at a speed (e.g., over fade time) identified by the multi-output command.

The load control device may determine whether to respond to the command. The load control device may receive the command and determine, based on the identifier in the start of the message (e.g., the starting output address block 202, 212, and/or output address block 222a-222n, as shown in FIGS. 2A, 2B, and 2C respectively), whether to respond to the command. The load control device may determine the starting identifier output address then count a number of bits to a position in the bitmap that corresponds to the load control device's own output address. The load control device may determine whether there is a logic one or logic zero in the bit associated with its output address. If there is a logic one, the load control device may respond to the command and determine the associated intensity level and fade time, for example, by looking to the intensity blocks and fade blocks in the command. In another example, the command may include the actual identifier of the load control device and the load control device may respond to the preset data that corresponds to the device output address.

If the received digital message includes a preset command at 364, the load control device may retrieve the preset data (e.g., the level, the fade time, and/or the delay time) for the preset indicated in the received preset command from memory (e.g., the device database) at 368. The load control device may execute according to the preset data recalled from memory at 370, before the device preset procedure 360 exits.

Figure 4A:
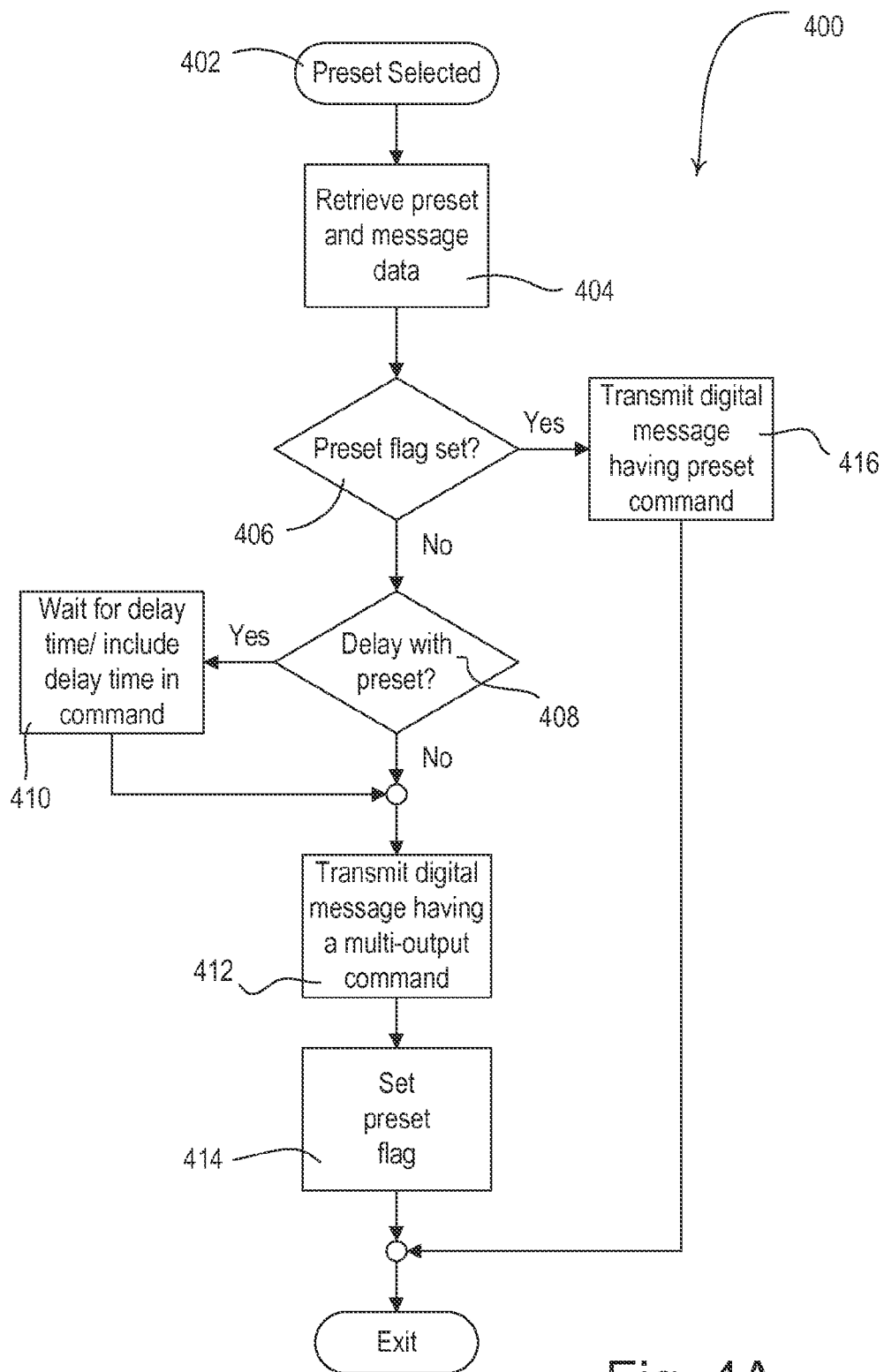
FIGS. 4A and 4B show simplified flowcharts of other example procedures executed by a system controller and/or load control devices of a load control system in order to select presets in the load control system.
Figure 4B:
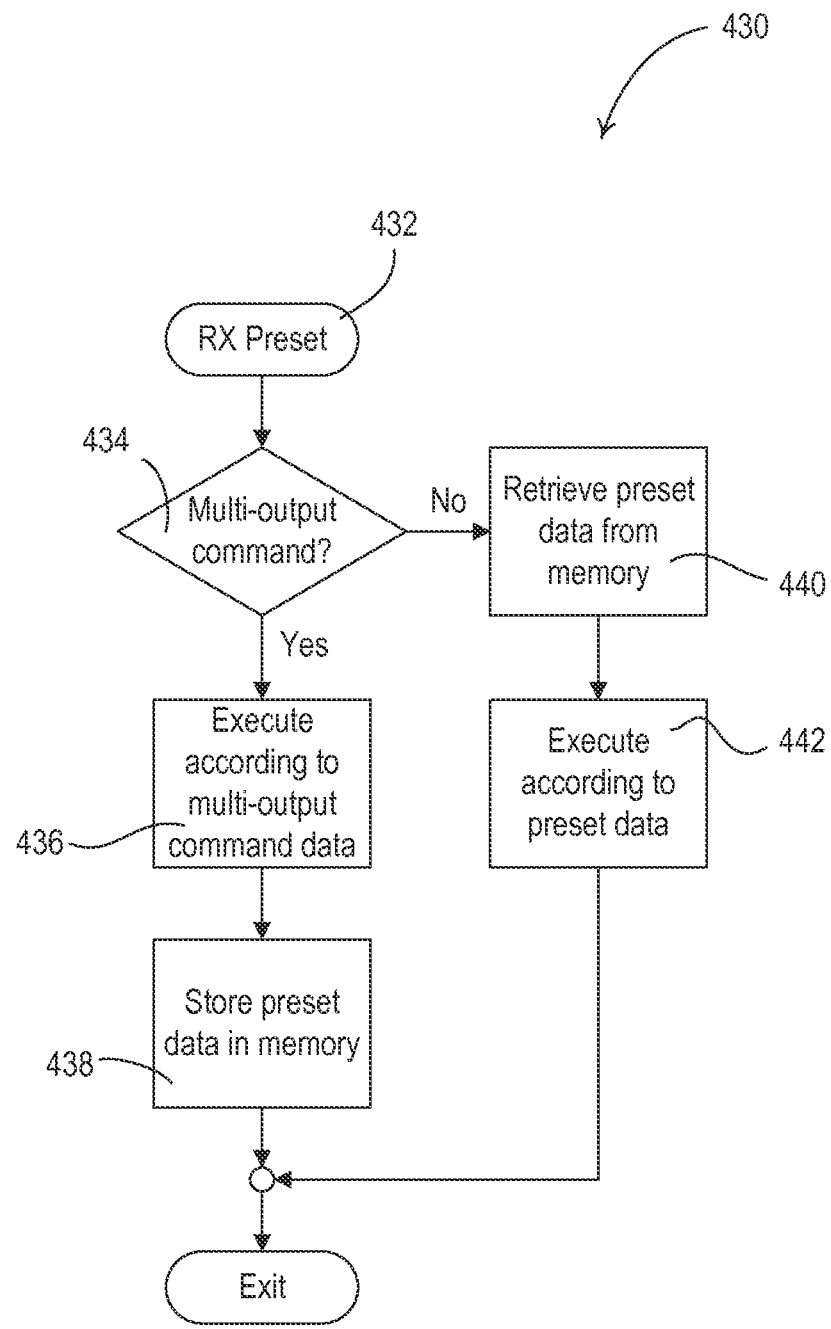

FIGS. 4A and 4B illustrate simplified flowcharts of example procedures executed by a system controller and/or load control devices of a load control system (e.g., the load control system 100 shown in FIG. 1) to select presets in the load control system. The system controller may transmit a multi-output command to the load control devices of the load control system when a preset is selected, for example, according to the procedures of FIGS. 4A and 4B. The system controller may transmit preset commands to the load control devices, for example, when that preset is subsequently selected. During the procedures of FIGS. 4A and 4B, the system controller may set a preset flag to indicate that the system controller already sent a multi-output command for a specific preset, such that the system controller may keep track of the presets for which the system controller has sent multi-output commands.

FIG. 4A is a simplified flowchart of an example of a controller preset procedure 400. The controller preset procedure 400 may be executed by the system controller, for example, in response to the selection of a preset at 402. At 404, the system controller may retrieve the preset and/or the message data from memory for the preset selected at 402. If the preset flag is not set for the selected preset at 406, the system controller may determine if the preset includes a delay time at 408. If the preset includes a delay, at 410, the system controller may wait for the delay time indicated in the preset. At 410, the delay time may also, or alternatively, be indicated in message data and/or the preset in the load control device. The delay may be set by a user when the preset is defined. The delay time may correspond to one or more devices based on a distance of the load control device from the system controller. Each load control device may individually delay execution of the command, for example, for a period of time from the receipt of the message. The system controller may transmit a digital message including the multi-output command at 412. The system controller may set the preset flag for the selected preset at 414, before the controller preset procedure 400 exits. If the preset does not include a delay time at 408, the system controller may transmit a digital message that may include the multi-output command at 412 (e.g., without delaying). If the preset does not include a delay time at 408, the system controller may set the preset flag for the selected preset at 414, before the controller preset procedure 400 exits. If the preset flag is set for the selected preset at 406, the system controller may transmit a digital message that may include the preset command at 416, and the controller preset procedure 400 may exit.

FIG. 4B is a simplified flowchart of an example of a device preset procedure 430. The device preset procedure 430 may be executed by the load control devices of the load control system, for example, in response to the selection of a preset at 432. If the received digital message includes a multi-output command at 434, the load control device may execute according to the preset data included in the multi-output command at 436. The load control device may store the preset data included in the multi-output command in memory at 438, before the device preset procedure 430 exits. If the received digital message includes a preset command at 434, the load control device may retrieve the preset data (e.g., the level, the fade time, and the delay time) for the preset indicated in the received preset command from memory (e.g., the device database) at 440. The preset command may include the name and/or identification number of the preset. For example, using the preset command, the load control device may perform a lookup on the device database. Based on the lookup utilizing the preset command, the load control device may determine the preset data. The load control device may execute according to the preset data recalled from memory at 442, and the device preset procedure 430 may exit.

Figure 5:
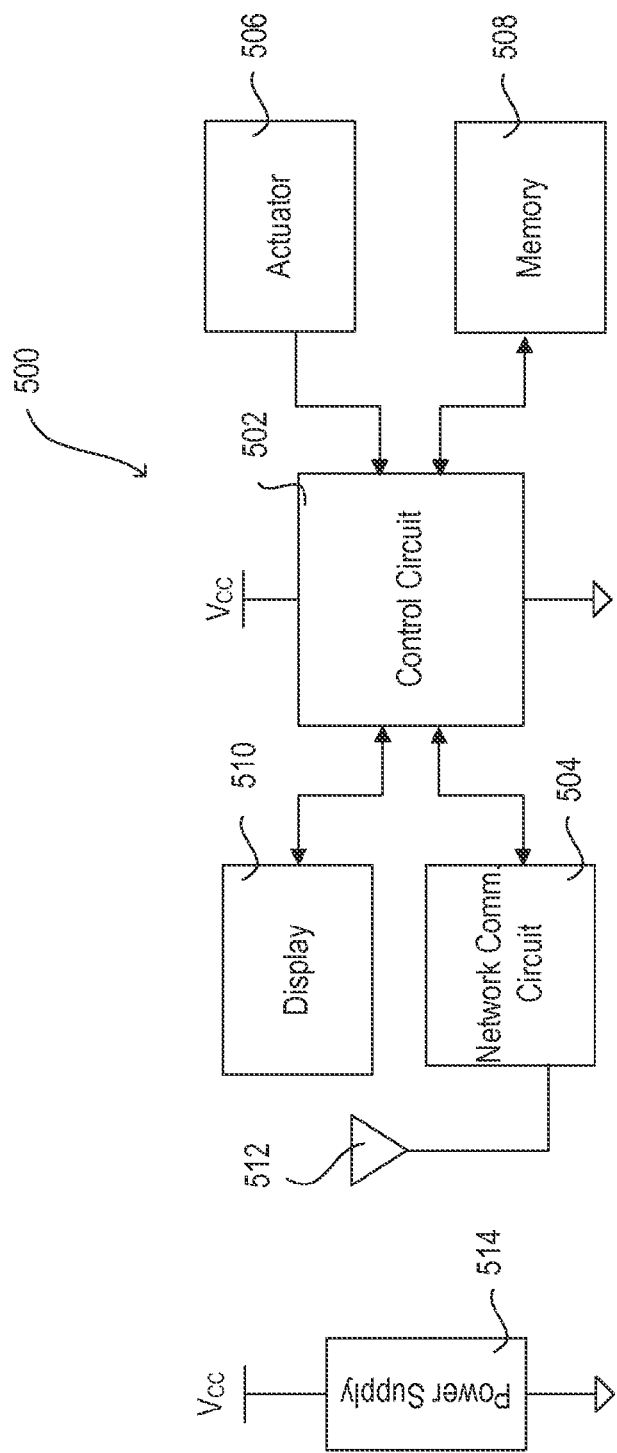
FIG. 5 is a simplified block diagram of an example network device.

FIG. 5 is a block diagram illustrating an example network device 500. The network device 500 may be a personal computer (e.g., personal computer 164), a server, a laptop, a tablet, a smart phone, a control-source device (e.g., an input device), and/or other suitable network communication device (e.g., an Internet-Protocol-enabled device), for example. The network device 500 may be used to store, communicate, and/or execute one or more presets or multi-output commands (e.g., as shown in FIGS. 2A, 2B, and/or 2C). For example, the network device 500 may perform the functions of personal computer 164 and/or the functions of control-source devices (e.g., input devise) in the load control system 100. The network device 500 may receive preset data (e.g., in a device database and/or a multi-output command), store preset data, and/or communicate the preset data in commands to other devices, such as the input devices and/or the system controller 110. The network device 500 may comprise a control circuit 502, which may include one or more of a processor (e.g., a microprocessor), a microcontroller, a programmable logic device (PLD), a field programmable gate array (FPGA), an application specific integrated circuit (ASIC), or any suitable processing device. The control circuit 502 may perform signal coding, data processing, power control, image processing, input/output processing, and/or any other functionality that enables the network device 500 to perform as described herein.

The control circuit 502 may store information in and/or retrieve information from the memory 508. The memory 508 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 502 may access the memory 508 for executable instructions and/or other information that may be used by the network device 500. The control circuit 502 may access instructions in the memory 508 for receiving, storing, and/or communicating the preset data and/or data in other commands (e.g., in response to selection of a preset).

The network device 500 may comprise a network communication circuit 504, which may be adapted to perform wired and/or wireless communications (e.g., with the system controller device 110 or another device over a network) on behalf of the network device 500. The network communication circuit 504 may be a wireless communication circuit, for example, including an RF transceiver coupled to an antenna 512 for transmitting and/or receiving RF signals. The network communication circuit 504 may communicate using Wi-Fi, a proprietary protocol (e.g., the ClearConnect® protocol), Bluetooth®, or any other RF communications. The control circuit 502 may be coupled to the network communication circuit 504 for transmitting and/or receiving digital messages via the RF signals, for example.

The network device 500 may comprise an actuator 506. The control circuit 502 may be responsive to the actuator 506 for receiving a user input. For example, the control circuit 502 may be operable to receive a button press from a user on the network device 500 for making a selection or performing other functionality on the network device 500.

The network device 500 may comprise a display 510. The control circuit 502 may be in communication with a display 510 for displaying information to a user. The communication between the display 510 and the control circuit 502 may be a two way communication, as the display 510 may include a touch screen module capable of receiving information from a user and providing such information to the control circuit 502.

The network device 500 may comprise a power supply 514 for generating a DC supply voltage $V_{CC}$ for powering the control circuit 502, the network communication circuit 504, the memory 508, the display 510, and/or other circuitry of the network device 500. The power supply 514 may be a battery or another source of power for the network device 500.

Figure 6:
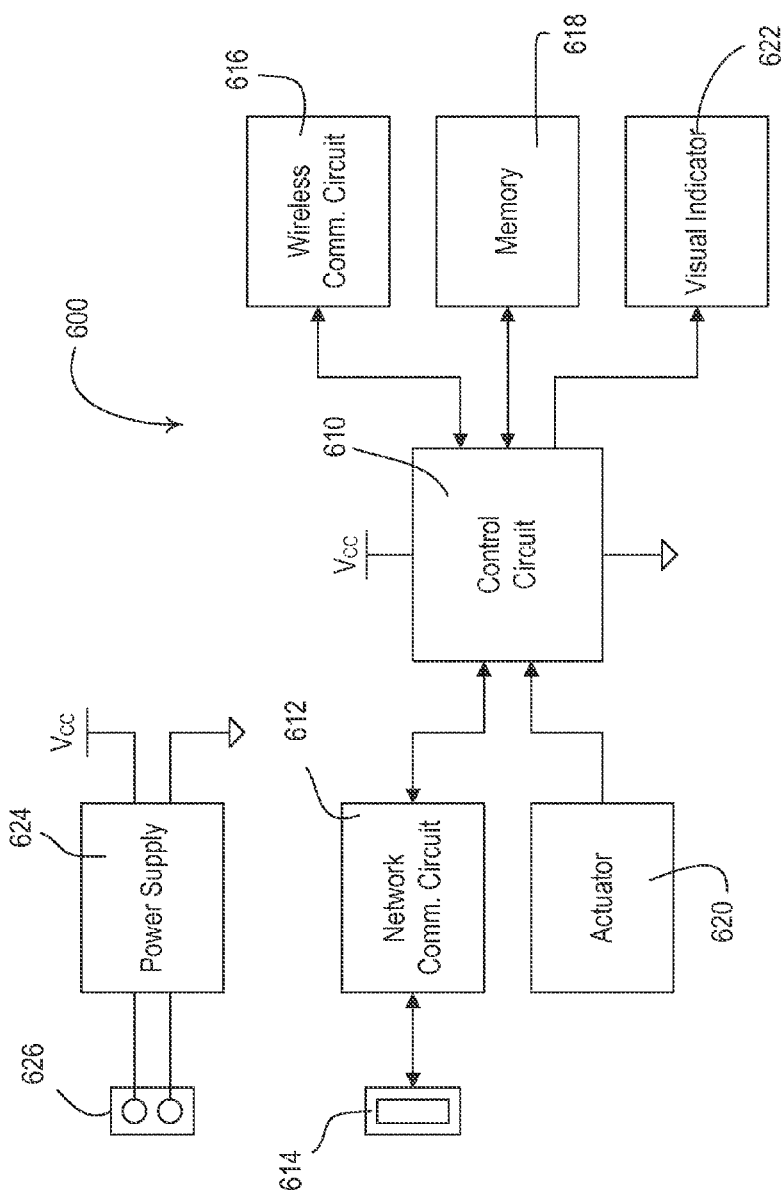
FIG. 6 is a simplified block diagram of an example system controller.

FIG. 6 is a simplified block diagram of an example system controller 600, which may be deployed as, for example, the system controller 110 of the load control system 100 shown in FIG. 1. The system controller 600 may comprise a control circuit 610, which may include one or more of a processor (e.g., a microprocessor), a microcontroller, a programmable logic device (PLD), a field programmable gate array (FPGA), an application specific integrated circuit (ASIC), or any suitable processing device. The control circuit 610 may perform signal coding, data processing, power control, input/output processing, and/or any other functionality that enables the system controller 600 to perform as described herein. The system controller 600 may comprise a network communication circuit 612 that may be coupled to a network connector 614 (e.g., an Ethernet jack), which may be adapted to be connected to a wired digital communication link (e.g., an Ethernet communication link) for allowing the control circuit 610 to communicate with network devices on a network. The network communication circuit 612 may be configured to be wirelessly connected to the network, e.g., using Wi-Fi technology to transmit and/or receive RF signals.

The system controller 600 may comprise a wireless communication circuit 616, for example, including an RF transceiver coupled to an antenna for transmitting and/or receiving RF signals. The wireless communication circuit 616 may communicate using a proprietary protocol (e.g., the ClearConnect® protocol). The control circuit 610 may be coupled to the wireless communication circuit 616 for transmitting digital messages via the RF signals, for example, to control the load control devices in the load control system 100 in response to digital messages received via the network communication circuit 612. The control circuit 610 may be configured to receive digital messages, for example, from the load control devices and/or the input devices.

The control circuit 610 may be responsive to an actuator 620 for receiving a user input. For example, the control circuit 610 may be operable to associate the system controller 600 with one or more control devices of the load control system 100 in response to actuations of the actuator 620 during a configuration procedure of the load control system 100. The system controller 600 may comprise additional actuators to which the control circuit 610 may be responsive.

The control circuit 610 may store information in and/or retrieve information from the memory 618. The memory 618 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 610 may access the memory 618 for executable instructions and/or other information that may be used by the system controller 600. The control circuit 610 may store the unique identifiers (e.g., serial numbers) of the control devices to which the system controller 600 is associated in the memory 618. The control circuit 610 may access instructions in the memory 618 for transmitting preset commands, transmitting multi-output commands, and/or performing other functions described herein. The control circuit 610 may store the multi-output command data and/or other preset data that may be used to control the load control devices in the memory 618.

The control circuit 610 may illuminate a visual indicator 622 to provide feedback to a user of the load control system 100. For example, the control circuit 610 may blink or strobe the visual indicator 622 to indicate a fault condition. The control circuit 610 may be operable to illuminate the visual indicator 622 different colors to indicator different conditions or states of the system controller 600. The visual indicator 622 may be illuminated by, for example, one or more light-emitting diodes (LEDs). The system controller 600 may comprise more than one visual indicator.

The system controller 600 may comprise a power supply 624 for generating a DC supply voltage $V_{CC}$ for powering the control circuit 610, the network communication circuit 612, the wireless communication circuit 616, the memory 618, the visual indicator 622, and/or other circuitry of the system controller 600. The power supply 624 may be coupled to a power supply connector 626 (e.g., a USB port) for receiving a supply voltage (e.g., a DC voltage) and/or for drawing current from an external power source.

Figure 7:
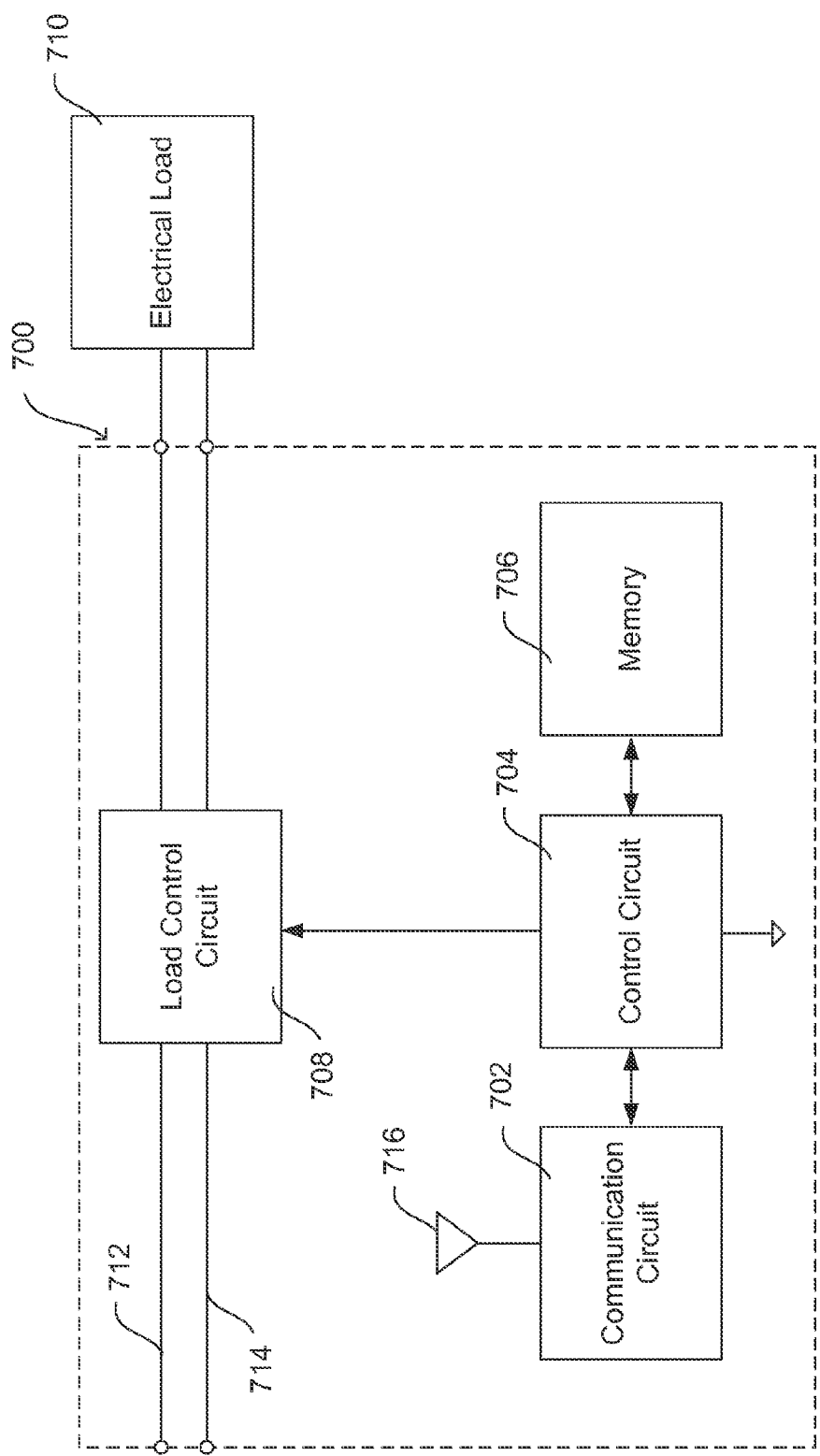
FIG. 7 is a block diagram illustrating an example load control device.

FIG. 7 is a block diagram illustrating an example load control device 700. The load control device 700 may be a control-source device and/or a control-target device for example. The load control device 700 may be a dimmer switch, an electronic switch, an electronic ballast for lamps, an LED driver for LED light sources, a plug-in load control device, a temperature control device (e.g., a thermostat), a motor drive unit for a motorized window treatment, or other load control device. The load control device 700 may include a communication circuit 702. The communication circuit 702 may include a receiver, an RF transceiver or other communication module capable of performing wired and/or wireless communications. The wireless communications may be performed via an antenna 716.

The communication circuit 702 may be in communication with a control circuit 704. The control circuit 704 may include one or more general purpose processors, special purpose processors, conventional processors, digital signal processors (DSPs), microprocessors, integrated circuits, a programmable logic device (PLD), application specific integrated circuits (ASICs), or the like. The control circuit 704 may perform signal coding, data processing, power control, input/output processing, or any other functionality that enables the load control device 700 to perform as described herein. For example, the control circuit 704 may execute control instructions according to preset data, retrieve preset data from storage, and/or the like.

The control circuit 704 may store information in and/or retrieve information from a memory 706. For example, the memory 706 may maintain a device database, preset data, multi-output command data, and/or other digital message information. The memory 706 may include a non-removable memory and/or a removable memory. The load control circuit 708 may receive instructions from the control circuit 704 and may control the electrical load 710 based on the received instructions. For example, the control circuit 704 may use the load control circuit 708 to control the electrical load 710 according to received preset data. The load control circuit 708 may receive power via the hot connection 712 and the neutral connection 714 and may provide an amount of power to the electrical load 710. The electrical load 710 may include any type of electrical load.

Although features and elements are described herein in particular combinations, each feature or element can be used alone or in any combination with the other features and elements. Although particular embodiments are described herein, the embodiments described herein are non-limiting and many other variations, modifications, and other uses are apparent. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A load control system comprising:
  a plurality of load control devices configured to control respective electrical loads; and
  a system controller configured to:
    in response to a first selection of a preset, communicate a first command to at least one of the plurality of load control devices, wherein the first command comprises preset data that defines one or more operations of the at least one load control device in response to a selection of the preset and further comprises a preset identifier for referencing the preset data;
    store within a database an indication for the preset that the preset data was communicated to the at least one load control device;
    in response to a second selection of the preset:
      determine from the indication for the preset stored within the database that the preset data was communicated to the at least one load control device; and
      based at least in part on determining from the indication for the preset stored within the database that the preset data was communicated to the at least one load control device, communicate a second command to the at least one load control device, wherein the second command comprises the preset identifier for referencing the preset data and does not include the preset data; and wherein the at least one load control device is configured to:
receive the first command;
in response to receiving the first command:
store the preset identifier and at least a portion of the preset data in a device database of the at least one load control device; and
control a respective electrical load using the preset data;
receive the second command; and
in response to receiving the second command:
use the preset identifier from the second command to access the preset data from the device database of the at least one load control device; and
control the respective electrical load using the preset data accessed from the database of the at least one load control device.

2. The load control system of claim 1, wherein each load control device of the plurality of load control devices is further configured to receive the first command and to store in a respective device database at least a portion of the preset data, wherein the stored preset data defines operation of the respective load control device in response to a selection of the preset.

3. The load control system of claim 2, wherein, in response to receiving the second command, each load control device of the plurality of load control devices is configured to control a respective electrical load using preset data accessed from the respective device database.

4. The load control system of claim 3, wherein, in response to receiving the first command, each load control device of the plurality of load control devices is further configured to control the respective electrical load using the preset data included in the first command.

5. The load control system of claim 1,
wherein the preset comprises a first preset; and
wherein the at least one load control device is further configured to store preset data that defines one or more operations of a second preset in the device database of the at least one load control device during a commissioning mode.

6. The load control system of claim 5, wherein the system controller is further configured to communicate the preset data that defines the one or more operations of the second preset to the at least one load control device during the commissioning mode.

7. The load control system of claim 1, wherein the system controller is further configured to:
determine whether to communicate the first command or the second command in response to the first selection of the preset based on a determination of whether the system controller has previously communicated the first command to the at least one load control device of the plurality of load control devices for the preset.

8. The load control system of claim 7, wherein each load control device of the plurality of load control devices is further configured to receive the first command and in response to receiving the first command, to store at least a portion of the preset data defining an operation of the respective load control device in response to a selection of the preset.

9. The load control system of claim 8, wherein each load control device of the plurality of load control devices is further configured to store the preset data defining the operation of the respective load control device when the respective load control device is indicated in the first command to operate in response to the first command.

10. The load control system of claim 1, wherein the at least one load control device of the plurality of load control devices is further configured, in response to receiving the first command, to store the preset data when a number of digital messages used to transit the first command exceeds a predetermined maximum number.

11. The load control system of claim 1,
wherein the system controller is further configured to set a flag in the first command when a number of digital messages used to transit the first command exceeds a predetermined maximum number, and
wherein the at least one load control device of the plurality of load control devices is further configured to store, in response to receiving the first command, the preset data when the flag is set in the first command.

12. The load control system of claim 1,
wherein the preset comprises a first preset; and
wherein the system controller is further configured to:
determine whether any of the plurality of load control devices are communicating digital messages to the system controller; and
communicate, to one or more load control devices of the plurality of load control devices, preset data that defines one or more operations of a second preset when none of the plurality of load control devices are communicating the digital messages.

13. The load control system of claim 1,
wherein the preset comprises a first preset; and
wherein the system controller is further configured to:
receive a load control database comprising preset data that defines one or more operations of the at least one load control device of the plurality of load control devices in response to a selection of a second preset, and
analyze, during a commissioning mode, the load control database to determine whether to communicate the preset data of the second preset to the at least one load control device during the commissioning mode.

14. The load control system of claim 13, wherein the system controller is further configured to:
determine a number of digital messages associated with communicating the preset data of the second preset to the at least one load control device of the plurality of load control devices; and
communicate the preset data of the second preset to the at least one load control device of the plurality of load control devices in response to the selection of the second preset when the number of digital messages associated with communicating the preset data of the second preset to the at least one load control device of the plurality of load control devices is less than or equal to a predetermined number.

15. The load control system of claim 14, wherein the system controller is configured to:
when the number of digital messages associated with communicating the preset data of the second preset to the at least one load control device of the plurality of load control devices is greater than the predetermined number:
communicate the preset data of the second preset to the at least one load control device of the plurality of load control devices during the commissioning mode; and
in response to the selection of the second preset, communicate a third command to the at least one load control device of the plurality of load control devices, wherein the third command comprises a preset identifier for referencing the preset data of the second preset.

16. The load control system of claim 1, wherein the system controller is further configured to delay communication of the first command by a delay time, wherein the delay time is an amount of time to delay the communication of the first command after selection of the preset.

17. The load control system of claim 1, wherein the preset identifier comprises at least one of a preset identification number and a preset identification name.

18. The load control system of claim 1, wherein the system controller is further configured to communicate the second command to a single load control device.

19. The load control system of claim 1, wherein the first command defines the preset in a single message.

20. The load control system of claim 1, wherein the system controller is further configured to communicate the first and second commands to at least two load control devices of the plurality of load control devices.

21. A method of controlling at least one load control device of a plurality of load control devices configured to control respective electrical loads, the method comprising:
receiving by at least one processor a first selection of a preset;
in response to receiving the first selection of the preset, communicating by the at least one processor a first command to the at least one load control device of the plurality of load control devices, wherein the first command comprises preset data that defines one or more operations of the at least one load control device in response to a selection of the preset and further comprises a preset identifier for referencing the preset data,
wherein receipt of the first command by the at least one load control device causes the at least one load control device to store the preset identifier and at least a portion of the preset data in a device database of the at least one load control device, and to control a respective electrical load using the preset data;
storing by the at least one processor within a database an indication for the preset that the preset data was communicated to the at least one load control device;
receiving by the at least one processor a second selection of the preset;
in response to receiving the second selection of the preset:
determining by the at least one processor from the indication for the preset stored within the database that the preset data was communicated to the at least one load control device; and
based at least in part on determining from the indication for the preset stored within the database that the preset data was communicated to the at least one load control device, communicating by the at least one processor a second command to the at least one load control device, wherein the second command comprises the preset identifier for referencing the preset data and does not include the preset data,
wherein receipt of the second command by the at least one load control device causes the at least one load control device to use the preset identifier from the second command to access the preset data from the device database of the at least one load control device, and to control the respective electrical load using the preset data accessed from the database of the at least one load control device.

22. The method of claim 21,
wherein the preset comprises a first preset; and
wherein the method further comprises:
receiving a load control database comprising preset data that defines one or more operations of the at least one load control device of the plurality of load control devices in response to a selection of a second preset; and
analyzing, during a commissioning mode, the load control database to determine whether to communicate the preset data of the second preset to the at least one load control device during the commissioning mode.

23. The method of claim 22, further comprising:
determining a number of digital messages associated with communicating the preset data of the second preset to the at least one load control device of the plurality of load control devices; and
communicating the preset data of the second preset to the at least one load control device of the plurality of load control devices in response to the selection of the second preset when the number of digital messages associated with communicating the preset data of the second preset to the at least one load control device of the plurality of load control devices is less than or equal to a predetermined number.

24. The method of claim 22, further comprising:
when the number of digital messages associated with communicating the preset data of the second preset to the at least one load control device of the plurality of load control devices is greater than a predetermined number:
communicating the preset data of the second preset to the at least one load control device of the plurality of load control devices during the commissioning mode; and
in response to the selection of the second preset, communicating a third command to the at least one load control device of the plurality of load control devices, wherein the third command comprises a preset identifier for referencing the preset data of the second preset.

25. The method of claim 21, further comprising:
delaying communicating the first command for a delay time, wherein the delay time is an amount of time to delay communicating the first command after selection of the preset.

26. The method of claim 21,
wherein receipt of the first command by each load control device of the plurality of load control devices causes each load control device to store in a respective device database at least a portion of the preset data, wherein the stored preset data defines operation of the respective load control device in response to a selection of the preset.

27. The method of claim 21, further comprising:
determining whether to communicate the first command or the second command in response to the first selection of the preset based on a determination of whether the first command has been previously communicated to the at least one load control device of the plurality of load control devices for the preset.

28. A system controller comprising:
at least one processor configured to:
receive a first selection of a preset;
in response to receiving the first selection of the preset, communicate a first command to at least one load control device of a plurality of load control devices, wherein the first command comprises preset data that defines one or more operations of the at least one load control device in response to a selection of the preset and further comprises a preset identifier for referencing the preset data,
  wherein receipt of the first command by the at least one load control device causes the at least one load control device to store the preset identifier and at least a portion of the preset data in a device database of the at least one load control device, and to control a respective electrical load using the preset data;
store within a database an indication for the preset that the preset data was communicated to the at least one load control device;
receive a second selection of the preset;
in response to receiving a second selection of the preset:
  determine from the indication for the preset stored within the database that the preset data was communicated to the at least one load control device; and
  based at least in part on determining from the indication for the preset stored within the database that the preset data was communicated to the at least one load control device, communicate a second command to the at least one load control device, wherein the second command comprises the preset identifier for referencing the preset data and does not include the preset data,
  wherein receipt of the second command by the at least one load control device causes the at least one load control device to use the preset identifier from the second command to access the preset data from the device database of the at least one load control device, and to control the respective electrical load using the preset data accessed from the database of the at least one load control device.

29. The system controller of claim 28,
wherein the preset comprises a first preset; and
wherein the at least one processor is further configured to:
  receive a load control database comprising preset data that defines one or more operations of the at least one load control device of the plurality of load control devices in response to a selection of a second preset, and
  analyze, during a commissioning mode, the load control database to determine whether to communicate the preset data of the second preset to the at least one load control device during the commissioning mode.

30. The system controller of claim 29, wherein the at least one processor is further configured to:
determine a number of digital messages associated with communicating the preset data of the second preset to the at least one load control device of the plurality of load control devices; and
communicate the preset data of the second preset to the at least one load control device of the plurality of load control devices in response to the selection of the second preset when the number of digital messages associated with communicating the preset data of the second preset to the at least one load control device is less than or equal to a predetermined number.

31. The system controller of claim 30, wherein the at least one processor is further configured to:
when the number of digital messages associated with communicating the preset data of the second preset to the at least one load control device of the plurality of load control devices is greater than the predetermined number:
  communicate the preset data of the second preset to the at least one load control device of the plurality of load control devices during the commissioning mode; and
  in response to the selection of the second preset, communicate a third command to the at least one load control device of the plurality of load control devices, wherein the third command comprises a preset identifier for referencing the preset data of the second preset.

32. The system controller of claim 28, wherein the at least one processor is further configured to delay communication of the first command by a delay time, wherein the delay time is an amount of time to delay the communication of the first command after selection of the preset.

33. The system controller of claim 28, wherein the at least one processor is further configured to:
determine whether to communicate the first command or the second command in response to the first selection of the preset based on a determination of whether the system controller has previously communicated the first command to the at least one load control device of the plurality of load control devices for the preset.

34. The system controller of claim 28,
wherein the at least one processor is further configured to set a flag in the first command when a number of digital messages associated with communicating the first command exceeds a predetermined maximum number; and
wherein the flag being set in the first command causes the at least one load control device of the plurality of load control devices to store, in response to receiving the first command, the preset data.

35. The system controller of claim 28,
wherein the preset comprises a first preset; and
wherein the at least one processor is further configured to:
  determine whether any of the plurality of load control devices are communicating digital messages to the system controller; and
  communicate, to one or more load control devices of the plurality of load control devices, preset data that defines one or more operations of a second preset when none of the plurality of load control devices are communicating the digital messages.

36. The system controller of claim 28,
wherein the preset comprises a first preset; and
wherein the at least one processor is further configured to communicate preset data that defines the one or more operations of a second preset to the at least one load control device of the plurality of load control devices during a commissioning mode.

37. The system controller of claim 28, wherein the preset identifier comprises at least one of a preset identification number and a preset identification name.

38. The system controller of claim 28, wherein the at least one processor is further configured to communicate the second command to a single load control device.

39. The system controller of claim 28, wherein the first command defines the preset in a single message.

40. The system controller of claim 28, wherein the at least one processor is further configured to communicate the first and second commands to at least two load control devices of the plurality of load control devices.

* * * * *